(12) United States Patent
Imamura

(10) Patent No.: US 7,080,096 B1
(45) Date of Patent: Jul. 18, 2006

(54) HOUSING SPACE-RELATED COMMODITY SALE ASSISTING SYSTEM, HOUSING SPACE-RELATED COMMODITY SALE ASSISTING METHOD, PROGRAM FOR ASSISTING HOUSING SPACE-RELATED COMMODITY SALE, AND COMPUTER-READABLE RECORDED MEDIUM ON WHICH PROGRAM FOR ASSISTING HOUSING SPACE-RELATED COMMODITY SALE IS RECORDED

(75) Inventor: Kayo Imamura, Moriguchi (JP)

(73) Assignee: Matsushita Electric Works, Ltd., Osaka (JP)

( * ) Notice: Subject to any disclaimer, the term of this patent is extended or adjusted under 35 U.S.C. 154(b) by 563 days.

(21) Appl. No.: 09/868,640

(22) PCT Filed: Nov. 2, 2000

(86) PCT No.: PCT/JP00/07731

§ 371 (c)(1),
(2), (4) Date: Jun. 28, 2001

(87) PCT Pub. No.: WO01/33446

PCT Pub. Date: May 10, 2001

(30) Foreign Application Priority Data

Nov. 2, 1999 (JP) .............................. 11-312561
Feb. 18, 2000 (JP) ............................ 2000-040844

(51) Int. Cl.
*G06F 17/30* (2006.01)
*G06F 17/00* (2006.01)
*G06F 3/00* (2006.01)
*G09G 5/00* (2006.01)
*G06T 15/00* (2006.01)

(52) U.S. Cl. .................... 707/104.1; 707/3; 707/10; 345/419; 345/902; 715/848

(58) Field of Classification Search .............. 707/1–10, 707/100–104.1, 200–205; 705/1–30, 64, 705/38; 345/870, 778, 853, 764, 738, 744, 345/689, 418, 6, 419, 588, 902; 709/203–218; 340/990, 995.2; 455/457; 348/36, 565; 715/730, 738, 848, 964; 703/1, 21; 700/98, 700/118; 706/919
See application file for complete search history.

(56) References Cited

U.S. PATENT DOCUMENTS 5,032,989 A * 7/1991 Tornetta ........................ 705/1
(Continued)

FOREIGN PATENT DOCUMENTS

EP      0779574      6/1997
(Continued)

OTHER PUBLICATIONS

Stephan,A et al. "Interactive modelling of 3-D environments", IEEE conference IECON 98, 6 pages.*
(Continued)

*Primary Examiner*—Srirama Channavajjala
(74) *Attorney, Agent, or Firm*—Greenblum & Bernstein, P.L.C.

(57) ABSTRACT

The inventive system includes a database for storing housing display data including layout information of a housing such as a real estate object, an interior display data including information regarding interior of the housing, and furniture display data including configuration information regarding furniture to be arranged in the housing. The inner space of the housing is displayable as a virtual space on the terminal of a computer of a prospective purchaser based on each of the data. The system provides a browser equipped with a manipulating menu with which a user manipulates the viewpoint or location of viewing in the virtual space. The system provides the user with each of the data via the Internet or its equivalent.

6 Claims, 13 Drawing Sheets

U.S. PATENT DOCUMENTS

| | | | |
|---|---|---|---|
| 5,584,025 A * | 12/1996 | Keithley et al. | 707/104.1 |
| 5,664,115 A * | 9/1997 | Fraser | 705/37 |
| 5,736,977 A * | 4/1998 | Hughes | 715/716 |
| 5,754,850 A * | 5/1998 | Janssen | 707/104.1 |
| 5,781,773 A * | 7/1998 | Vanderpool et al. | 707/100 |
| 5,794,216 A * | 8/1998 | Brown | 705/27 |
| 5,889,951 A * | 3/1999 | Lombardi | 709/219 |
| 5,900,564 A * | 5/1999 | Kurakake | 84/477 R |
| 5,926,179 A * | 7/1999 | Matsuda et al. | 715/752 |
| 5,930,770 A * | 7/1999 | Edgar | 705/28 |
| 5,991,769 A * | 11/1999 | Fino et al. | 345/619 |
| 6,058,379 A * | 5/2000 | Odom et al. | 705/37 |
| 6,154,211 A | 11/2000 | Kamachi et al. | |
| 6,201,546 B1 * | 3/2001 | Bodor et al. | 345/620 |
| 6,263,499 B1 * | 7/2001 | Nakamura et al. | 717/171 |
| 6,314,404 B1 * | 11/2001 | Good et al. | 705/1 |
| 6,321,202 B1 * | 11/2001 | Raveis, Jr. | 705/1 |
| 6,323,885 B1 * | 11/2001 | Wiese | 715/835 |
| 6,385,541 B1 * | 5/2002 | Blumberg et al. | 701/213 |
| 6,397,208 B1 * | 5/2002 | Lee | 707/3 |
| 6,466,239 B1 * | 10/2002 | Ishikawa | 715/850 |
| 6,484,176 B1 * | 11/2002 | Sealand et al. | 707/10 |
| 6,496,189 B1 * | 12/2002 | Yaron et al. | 345/428 |
| 6,519,618 B1 * | 2/2003 | Snyder | 707/104.1 |
| 6,563,529 B1 * | 5/2003 | Jongerius | 348/36 |
| 6,590,586 B1 * | 7/2003 | Swenton-Wall et al. | 715/730 |
| 6,594,633 B1 * | 7/2003 | Broerman | 705/1 |
| 6,615,187 B1 * | 9/2003 | Ashenmil et al. | 705/35 |
| 6,636,803 B1 * | 10/2003 | Hartz et al. | 701/208 |
| 6,711,554 B1 * | 3/2004 | Salzmann et al. | 705/64 |
| 6,760,707 B1 * | 7/2004 | Provost | 705/26 |
| 6,829,584 B1 * | 12/2004 | Loveland | 705/7 |
| 6,839,880 B1 * | 1/2005 | Morse et al. | 715/513 |
| 6,871,140 B1 * | 3/2005 | Florance et al. | 701/207 |
| 6,879,322 B1 * | 4/2005 | Iida et al. | 345/419 |
| 2001/0034607 A1 * | 10/2001 | Perschbacher et al. | 705/1 |
| 2001/0034661 A1 * | 10/2001 | Ferreira | 705/26 |
| 2002/0052755 A1 * | 5/2002 | Whatley et al. | 705/1 |
| 2002/0082942 A1 * | 6/2002 | Shimazu | 705/26 |
| 2002/0113791 A1 * | 8/2002 | Li et al. | 345/427 |
| 2002/0118883 A1 * | 8/2002 | Bhatt | 382/224 |
| 2003/0004861 A1 * | 1/2003 | Amend et al. | 705/37 |
| 2003/0064705 A1 * | 4/2003 | Desiderio | 455/412 |
| 2003/0083957 A1 * | 5/2003 | Olefson | 705/27 |
| 2003/0113820 A1 * | 6/2003 | Reiter et al. | 435/7.23 |
| 2003/0156134 A1 * | 8/2003 | Kim | 345/753 |
| 2003/0179240 A1 * | 9/2003 | Gest | 345/679 |
| 2004/0059586 A1 * | 3/2004 | Brimberry et al. | 705/1 |
| 2004/0183826 A1 * | 9/2004 | Taylor et al. | 345/738 |
| 2005/0081161 A1 * | 4/2005 | Macinnes et al. | 715/765 |
| 2005/0275458 A1 * | 12/2005 | Mukherjee et al. | 330/253 |

FOREIGN PATENT DOCUMENTS

| | | | |
|---|---|---|---|
| EP | 1220125 A2 * | 7/2002 | 17/60 |
| EP | 1369822 A2 * | 12/2003 | 15/20 |
| JP | 9-81781 | 3/1997 | |
| JP | 10-97558 | 4/1998 | |
| JP | 10097558 | 4/1998 | |
| JP | 10124574 | 5/1998 | |
| JP | 10154052 | 6/1998 | |
| JP | 3061933 | 6/1999 | |
| JP | 11259528 | 9/1999 | |
| JP | 11292466 | 10/1999 | |
| KR | 1999-0068557 | 9/1999 | |
| WO | 97/00474 | 1/1997 | |
| WO | WO 97/41508 * | 11/1997 | |
| WO | 98/47106 | 10/1998 | |
| WO | WO 98/55949 * | 12/1998 | |
| WO | WO 2004/042494 A2 * | 5/2004 | |
| WO | WO 2005/038581 A2 * | 4/2005 | |
| WO | WO 2005/124584 A2 * | 12/2005 | |

OTHER PUBLICATIONS

Michel Buffa et al. "3D -virtual warehouse on the WEB", Design techniques, Internet computing, Mar.-Apr. 2000, 6 pages.*

Norman Murray et al. "A Virtual envirnonment for building construction", 1998, 6 pages.*

Ehud Sharlin et al. "3D computer interaction using physical objects: exploration of tangible user interfaces", Human factors in computing systems (CHI) 98, Apr. 18-23, 1998 , 8 pages.*

Zhangxi Lin et al. Web based services for real estate: model and implementation, IT Pro Jan./Feb. 2004, published by th IEEE computer society, pp. 52-57.*

Kok Meng Pua et al. "VIDSEEK: Dynamic multi-dimensional browsing of video archieves", no date, 17 pages.*

Jantien Stoter et al. "cadastral registration of real estate objects in three dimension," URISA Journal,vol. 15, No. 2, 2003, pp. 47-56.*

Deepak Bandyopadhyay et al. "dynamic sharder lamps: painting on real objects", Mitsubishi electric research laboratories, TR-2001-50, Feb. 2002, 1-10 pages.*

Ianus Keller et al. "supporting informal collections of digital images: organizing, browsing and sharing", no date, 4 pages.*

Knut Manske, "video browsing using 3D video content trees", ACM 2001 pp. 20-24.*

Venkat N Gudivada et al. "spatial knowledge representation and retrieval in 3-D image databases", appeared in multimedia computing and systems, 1995 proceedings, pp. 90-97.*

Takao Shimomura et al. "Web application generator by image-oriented design", ACM SIGSOFT software engineering notes, vol. 28, issue 2, Mar. 2003, 6 pages.*

Zhigeng Pan et al. "easy tour: a new image-based virtual tour system", proceedings of the 2004 ACM SIGGRAPH internatinal conference on virtual reality continuum and its applications in industry, 2004, pp. 467-471.*

Andrew J Hanson et al. "Constrained 3D navigation with 2D controllers", Proceedings in Visualization '97, Oct. 1997, pp. 175-182.*

English Language Abstract of JP 10-097558.

English Language Abstract of JP 11-292466.

English Language Abstract of JP 9-81781.

English Language Abstract of JP 10-97558.

An article entitled "How Quick Time VR Works", published by Apple Computer Inc., 1998, downloaded from http://www.web.archive.org/web/ 1990117025031/www.apple.com/quicktime/information/howvr.html, on Nov. 16, 2004.

An article entitled "Virtual Views—Virtual Tours on the Internet", published by Virtual Views, 1998, downloaded from http://web.archive.org/web 19981207043047/www.virtualviews.com/html/frameset.html on Apr. 4, 2005.

"An article entitled IPIX on the bubble", published by Forbes.com, Sep. 17, 1999, downloaded from http://www.forbes.com/1999/09/17/feat-print.html on Apr. 4, 2005.

Chan et al., "A Solid Modeling Library for the World Wide Web", Computer Networks and ISDN Systems, vol. 30, No. 20-21, pp. 1853-1863, Nov. 12, 1998, North Holland Publishing, Amsterdam, NL.

Rau-Chaplin et al., "Graphics Support for a World-Wide-Web Based Architectural Design Service", Computer Networks and ISND Systems, vol. 29, No. 14, pp. 1611-1623, Oct. 1, 1997, North Holland Publishing, Amsterdam, NL.

Bajaj et al., "Web Based Collaborative CAAD", Online! 1998, retrieved on Sep. 19, 2002, pp. 1-17; & Bajaj et al., Web Based Collaborative CAAD, Proceedings of the 1999 Fifth ACM Symposium on Solid Modeling and Applications, Jun. 1999, pp. 326-327, New York, NY.

Harder et al., "Supporting Adaptable Technical Information Systems in Heterogeneous Environments—Using WWW and ORDBMS", Database and Expert Systems Applications, IEEE Proceedings Eighth International Workshop, pp. 295-303, Sep. 1, 1997, Los Alamitos, CA.

Lewis et al., "Generation of 3D Building Models from 2D Architectural Plans", Computer-Aided Design, vol. 30, No. 10, pp. 765-779, Sep. 1998, Elsevier Publishers, Barking, GB.

Sauce et al., "A Knowledge-Based System for Construction-Site Organization", Microcomputers in Civil Engineering, vol. 10, No. 3, pp. 187-197, 1995, Elsevier Science Ltd., Oxford, GB.

Rau-Chapin et al., "The LaHave-House Project" Towards an Automated Architectural Design Service, Proceedings of the International Conference on Computer-Aided Design, Sep. 1996, 8 pages.

English Language Abstract of JP 11-259528.

English Language Abstract of JP 10-124574.

* cited by examiner

FIG.5

| PRESENT OBJECTS ON SALE | | | |
|---|---|---|---|
| OBJECT A | SALES OFFER FROM MR. a | ¥30,000,000 | (CONTACT) |
| OBJECT B | SALES OFFER FROM COMPANY b | ¥60,000,000 | (CONTACT) |
| UN-REGISTERED | | | |
| UN-REGISTERED | | | |

HOUSING SPACE-RELATED COMMODITY SALE ASSISTING SYSTEM, HOUSING SPACE-RELATED COMMODITY SALE ASSISTING METHOD, PROGRAM FOR ASSISTING HOUSING SPACE-RELATED COMMODITY SALE, AND COMPUTER-READABLE RECORDED MEDIUM ON WHICH PROGRAM FOR ASSISTING HOUSING SPACE-RELATED COMMODITY SALE IS RECORDED

TECHNICAL FIELD

This invention relates to a housing-related commodity sales support system for selling housing-related commodity such as objects of real estate and furniture via a network system such as the Internet, a method for supporting housing-related commodity sales, a program for supporting housing-related commodity sales, and a computer-readable storage medium storing such a program.

BACKGROUND ART

Heretofore, there has been a sales tool that enables a customer to view a three-dimensional image of an object of real estate. Through the sales tool, an interior image of a room of a prototype housing or a model room is photographed using a QTVR technology, and images from all angular orientations relative to the photographed location are viewable via a freely-movable operation interface (for instance, Live Picture interface). This method, however, fails to provide an image of an object which does not actually exist in terms of a three-dimensional display.

In the field of virtual image play, there has been implemented a technique in which a house is fabricated into a three-dimensional image in a virtual space and such a virtual image is presented via the Internet. However, since this technique lacks the idea of providing inputs for sales, there has not been prepared display of information necessary in the field of architecture (data input related to precise dimensions of the housing, display of a lintel joist and a head jamb, etc.). Further, movement in a three-dimensional space is provided by an interface which provides free movement in a three-dimensional space by a mouse, which is not easily handled by general users.

There has not been provided a system in which a three-dimensional configuration of an object is registered and presented on the Internet to enable edition and designing of the object image in a three-dimensional virtual space. Further, in the real-estate-related business, a tool has not been available which facilitates interior coordination and designing and provides an environment that implements electronic commercial transaction. There have not been provided services that enable creation and sales of contents related to the real estate business in the form of three-dimensional image display and realize low-cost sales of software applications for browsing the contents.

In view of the above, an object of this invention is to build up a system which enables any one, from any where, at any time, to retrieve data relating to real estate objects on sale while verifying the object images as images in a three-dimensional virtual space, thereby renovating the conventional sales systems of real estate objects. Another object of this invention is to provide a system that gives feasibility to general consumers who are not skilled in computers and manipulation in a three-dimensional virtual space.

More specifically, an object of this invention is to provide services on the Internet which enable persons engaging in real estate business to advertise and present three-dimensional images of real estate objects to prospective purchasers with ease. Another object of this invention is to provide services on the Internet that enable to implement layout simulation of parts, facility or interior commodity related to housing in conjunction with images disposed in a three-dimensional virtual space, as well as advertisement of products (parts, facility, or interior commodity related to housing). A still another object of this invention is to provide services that enable selling (purchase) of the objects. A yet another object of this invention is to provide services on the Internet that enable any one to easily simulate change of interior commodity in a room, layout of furniture or reforming of housing.

DISCLOSURE OF THE INVENTION

In view of the above, a housing-related commodity sales support system according to this invention is provided with a database for storing housing display data including layout information regarding housings, etc. The inner space of a housing is displayable as a virtual space on the terminal of a computer of a prospective purchaser based on the data. The system is so configured as to provide a browser equipped with a manipulating menu with which a user manipulates a viewpoint or location of viewing in the virtual space, and to provide the user with the data via a network system.

In view of the above, a housing-related commodity sales support method according to this invention comprises storing housing display data including layout information of housings in a database, causing the inner space of a housing to be displayed as a virtual space on the terminal of a computer of a prospective purchaser based on the data, providing a browser equipped with a manipulating menu with which the user manipulates the viewpoint or location of viewing in the virtual space, and providing the user with the data via a network system.

In view of the above, a housing-related commodity sales support program and a storage medium storing such a program according to an aspect of this invention are so configured as to obtain housing display data including layout information of housings from a predetermined database via a network system, to display the inner space of a housing as a virtual space based on the housing display data, and activate a computer as the browser equipped with a manipulating menu with which the user manipulates a viewpoint or location of viewing in the virtual space.

In view of the above, a housing-related commodity sales support program and a storage medium storing such a program according to another aspect of this invention are so configured as to control a predetermined database via a network system to activate a computer as a data registration tool with which a user registers housing display data including layout information regarding housings.

In this specification, the housing-related commodity include interior commodity and furniture for housings as well as real estate objects.

According to the inventive system, method, program, and storage medium, housing-related commodity such as real estate objects and furniture can be verified and searched via the network system such as the Internet. Further, since the data are distributed via the network, users can view the most updated information at any time, and verify the information by the most updated browser software at any time.

BRIEF DESCRIPTION OF THE DRAWINGS

FIG. 5 is an exemplary diagram showing a displayed screen image of an object browsing tool used on the inventive system.

BEST MODE FOR CARRYING OUT THE INVENTION

Figure 1:
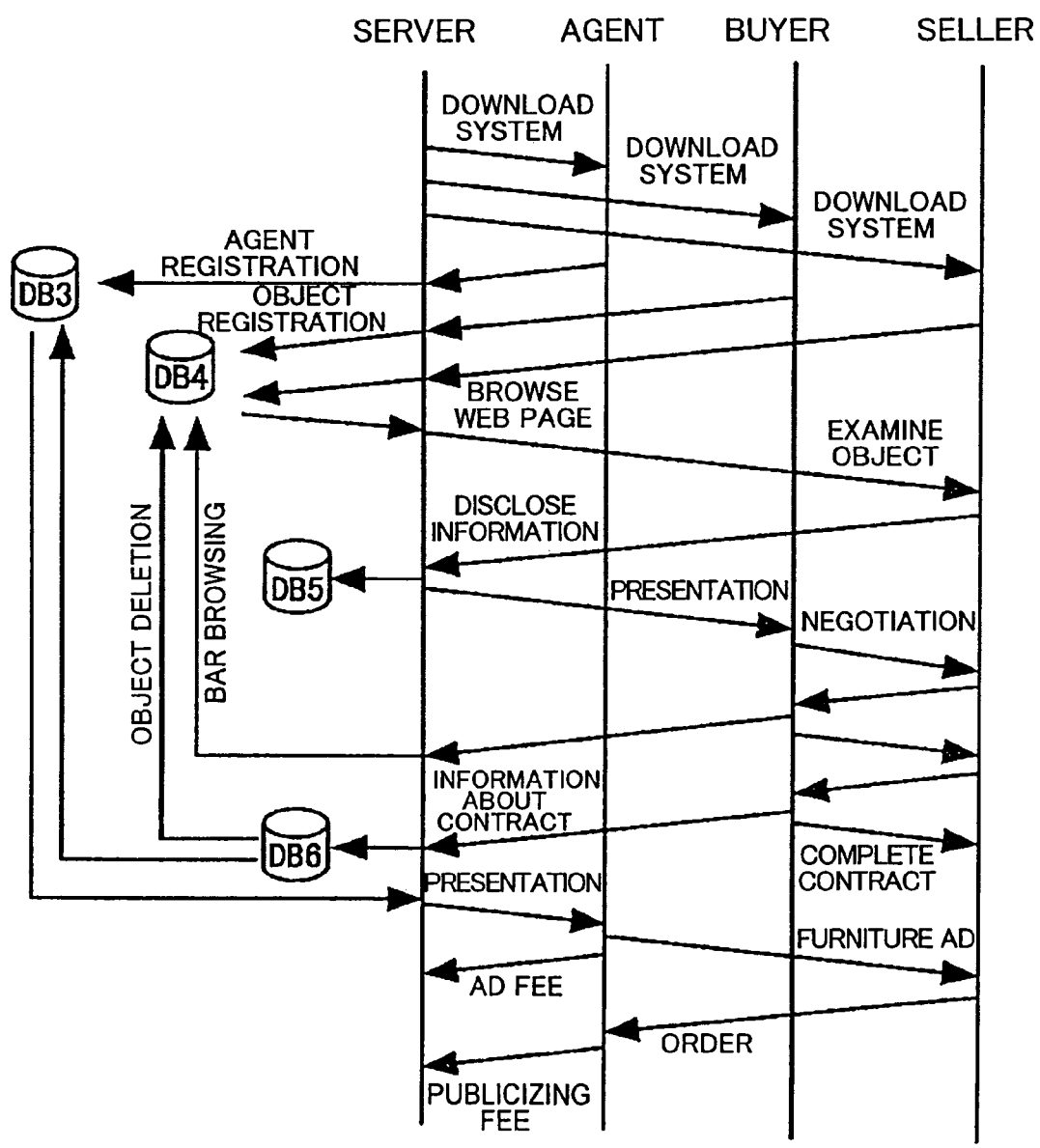
FIG. 1 is an exemplary diagram showing a flow of a real estate object sales support method according to this invention.

FIG. 1 is a diagram showing an exemplary configuration of the housing-related commodity sales support system embodying this invention. The housing-related commodity sales support method of this invention is optimally effectuated with this system. The program for supporting housing-related commodity sales and the storage medium storing the program of this invention are also optimally applicable to this system.

The system is composed of a server computer mainly designed for administering a system for real estate agents engaged in selling real estate objects.

The server is operatively linked to each of personal computers which are owned by possible sellers intending to sell real estate objects, prospective buyers planning to buy real estate objects, and agents handling various services related to real estate so as to transmit and receive information among then via the Internet.

The server publicizes software applications such as a browser software which enables the agents, possible sellers, prospective buyers, etc. to utilize the inventive system on his own personal computer, as well as data on web pages thereof so that the agents, possible sellers, and prospective buyers can freely download the software applications and data via the Internet. In other words, the server is provided with browser providing means, data transmitting means, and data registration tool providing means.

Figure 4:
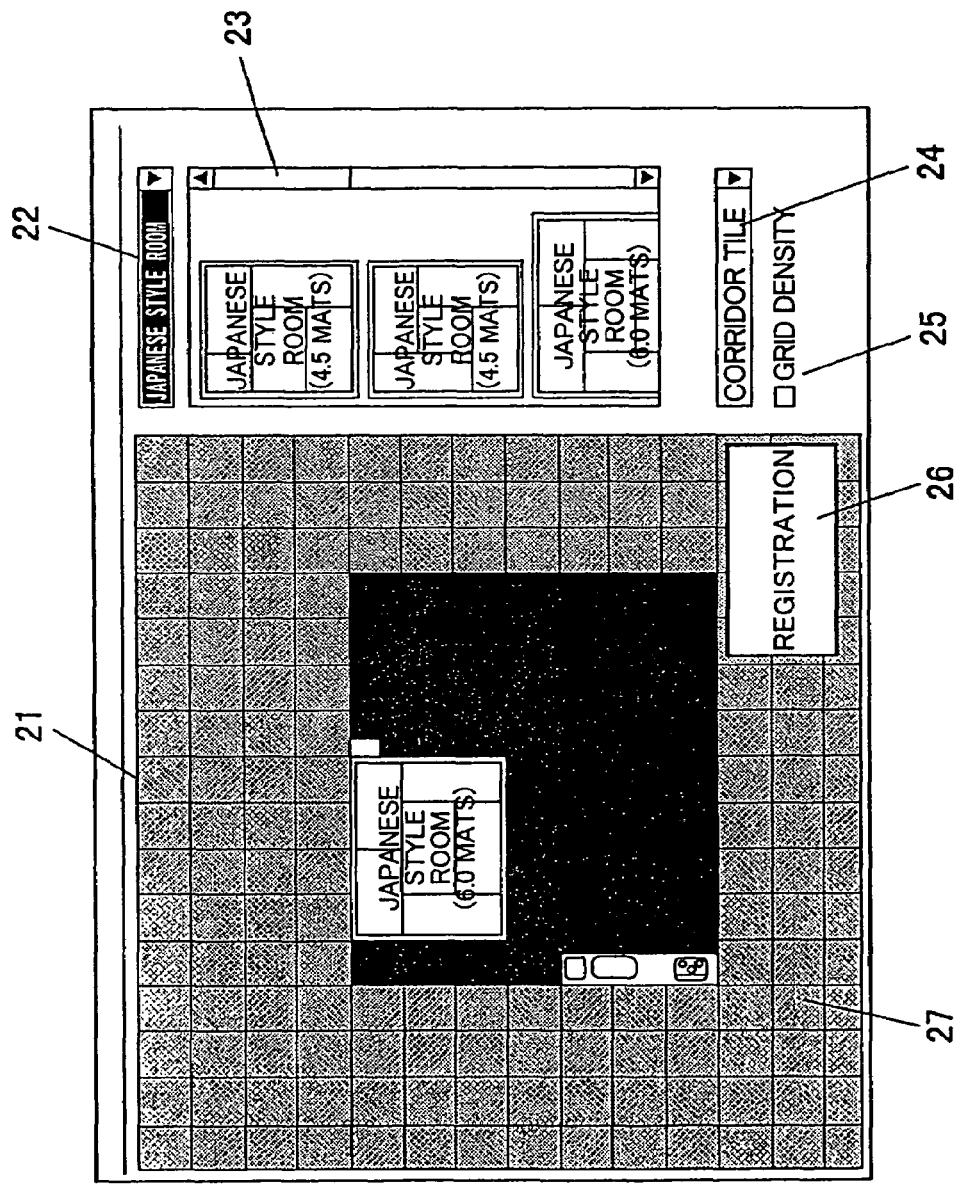
FIG. 4 is an exemplary diagram showing a displayed screen image of an object registration tool used on a real estate object sales support system according to this invention.

With this arrangement, possible sellers can register information concerning objects which they have an intention to sell, to a database DB4 of the server by way of an object registration tool as illustrated in FIG. 4. The seller may be an individual or a business corporation.

Figure 6:
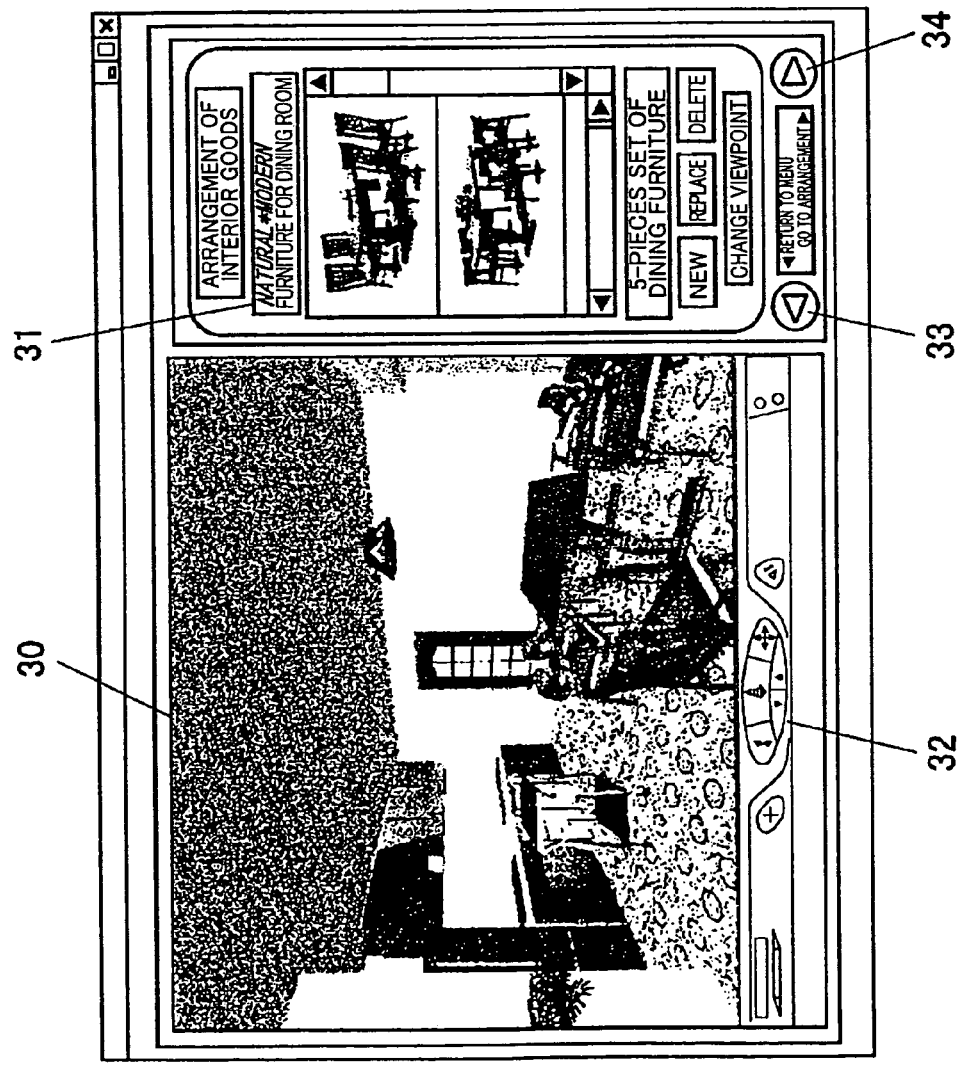
FIG. 6 is an exemplary diagram showing a displayed screen image of a furniture display room used on the inventive system.
Figure 7:
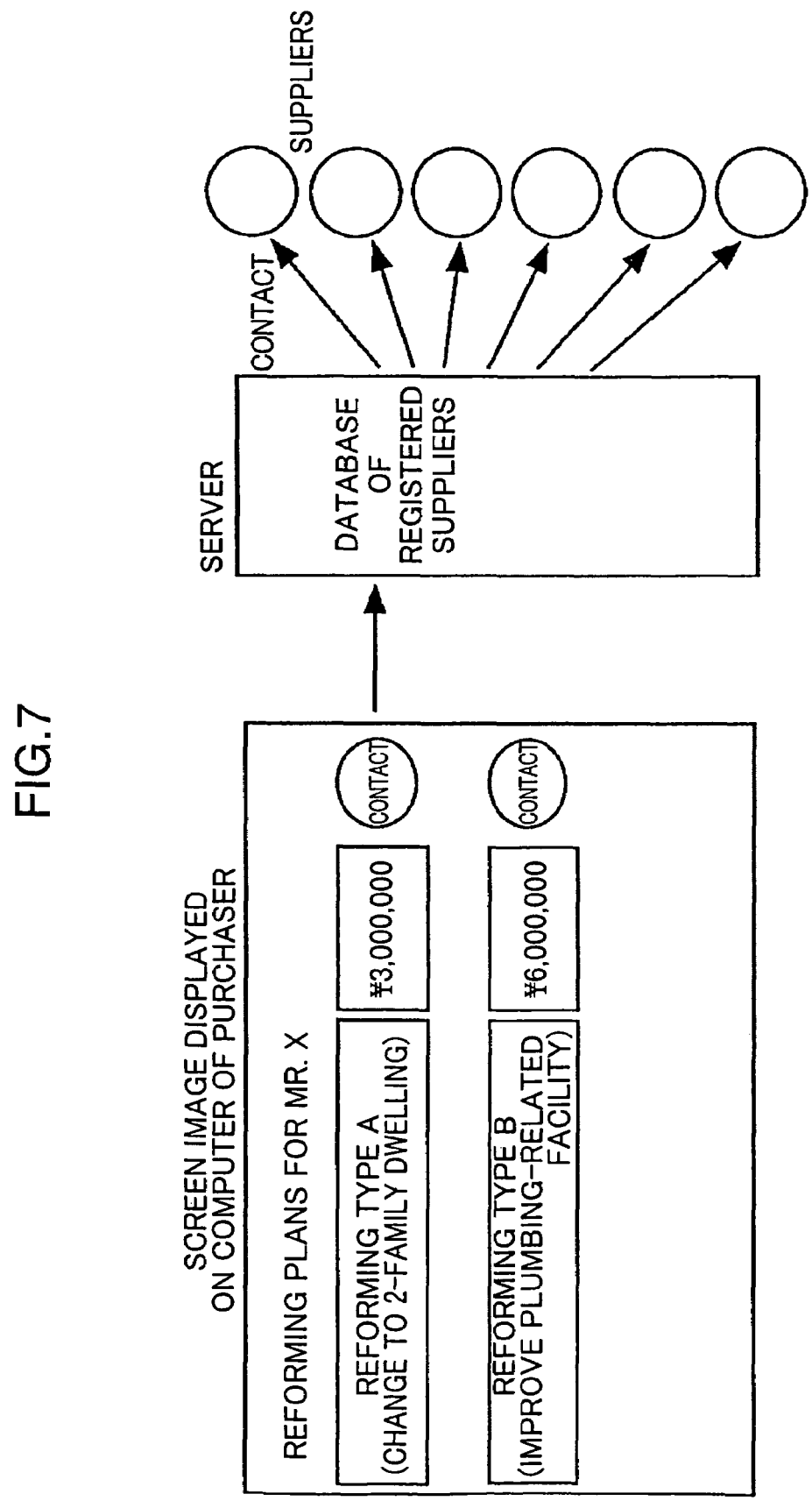
FIG. 7 is an exemplary diagram showing a reforming proposal on the inventive system.

Further, with this arrangement, prospective buyers can browse information concerning an object which they would like to purchase through the database DB4 of the server by way of an object browsing tool as illustrated in FIG. 5, purchase furniture by visiting a virtual furniture display room as illustrated in FIG. 6, and be suggested of a reforming plan as illustrated in FIG. 7 after the purchase. Furthermore, the prospective buyer can grasp the object in details before purchase by using a virtual reality experiencing system as illustrated in FIGS. 8 through 12.

Hereinafter, a flow of the system until sales contract of a real estate object is completed is described with reference to FIG. 1.

First, an agent registers his contact address and services in which the agent specializes in an agent registration database DB3 of the server. This operation enables the agent to be informed of client data in a process of sales negotiation and at the time of finalizing a sales contract. A possible seller registers information concerning an object which the seller intends to sell in the object registration database DB4 of the server, and registers his contact address, sales price, etc. The information concerning the object on sale includes housing display data which renders a space regarding the housing to be displayable as a 3D virtual space by the browser on the personal computer of a prospective buyer. This housing display data is correlated with an actual object of real estate.

Figure 8:
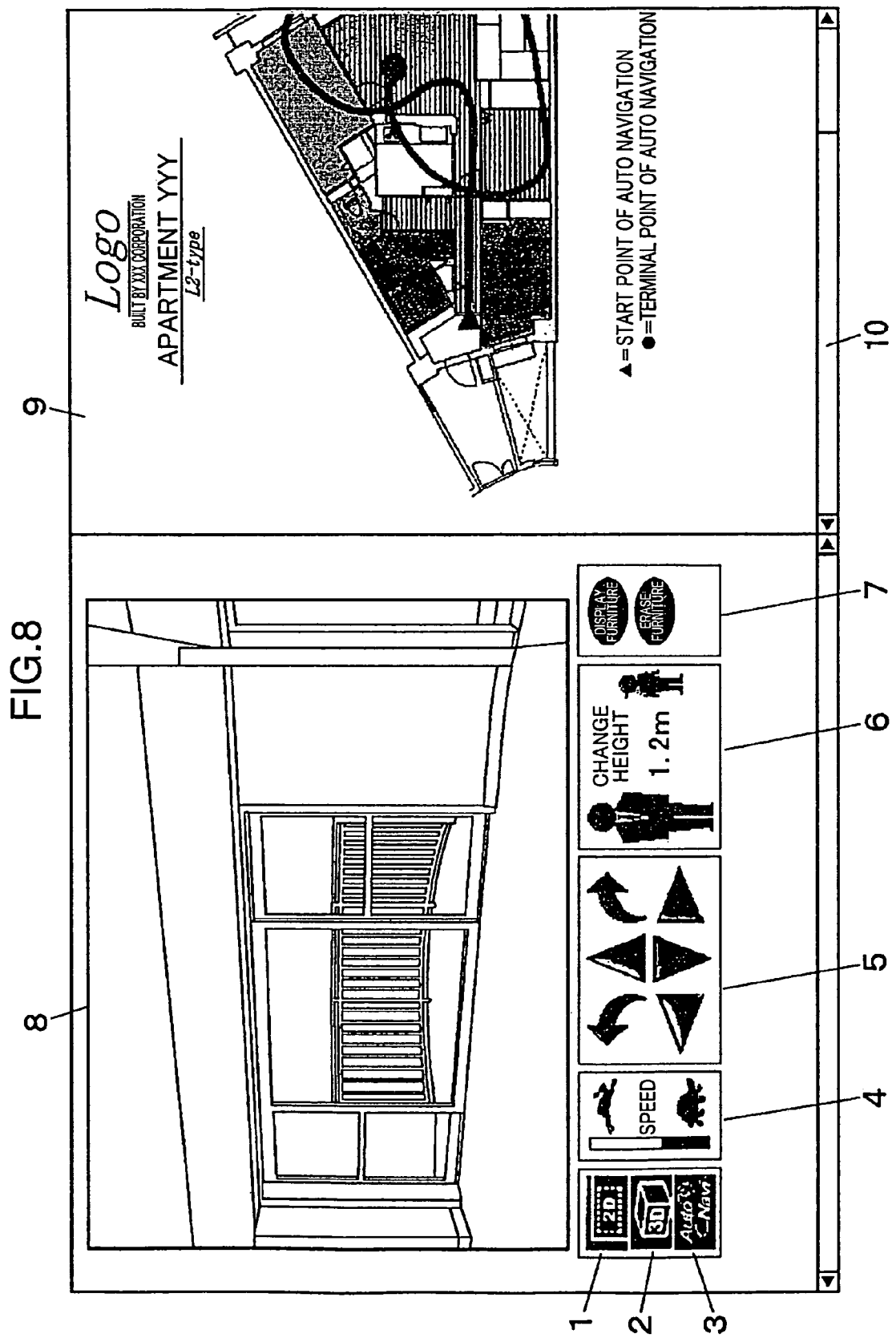
FIG. 8 is an exemplary diagram showing a displayed screen image on a virtual space display system used in this invention.
Figure 9:
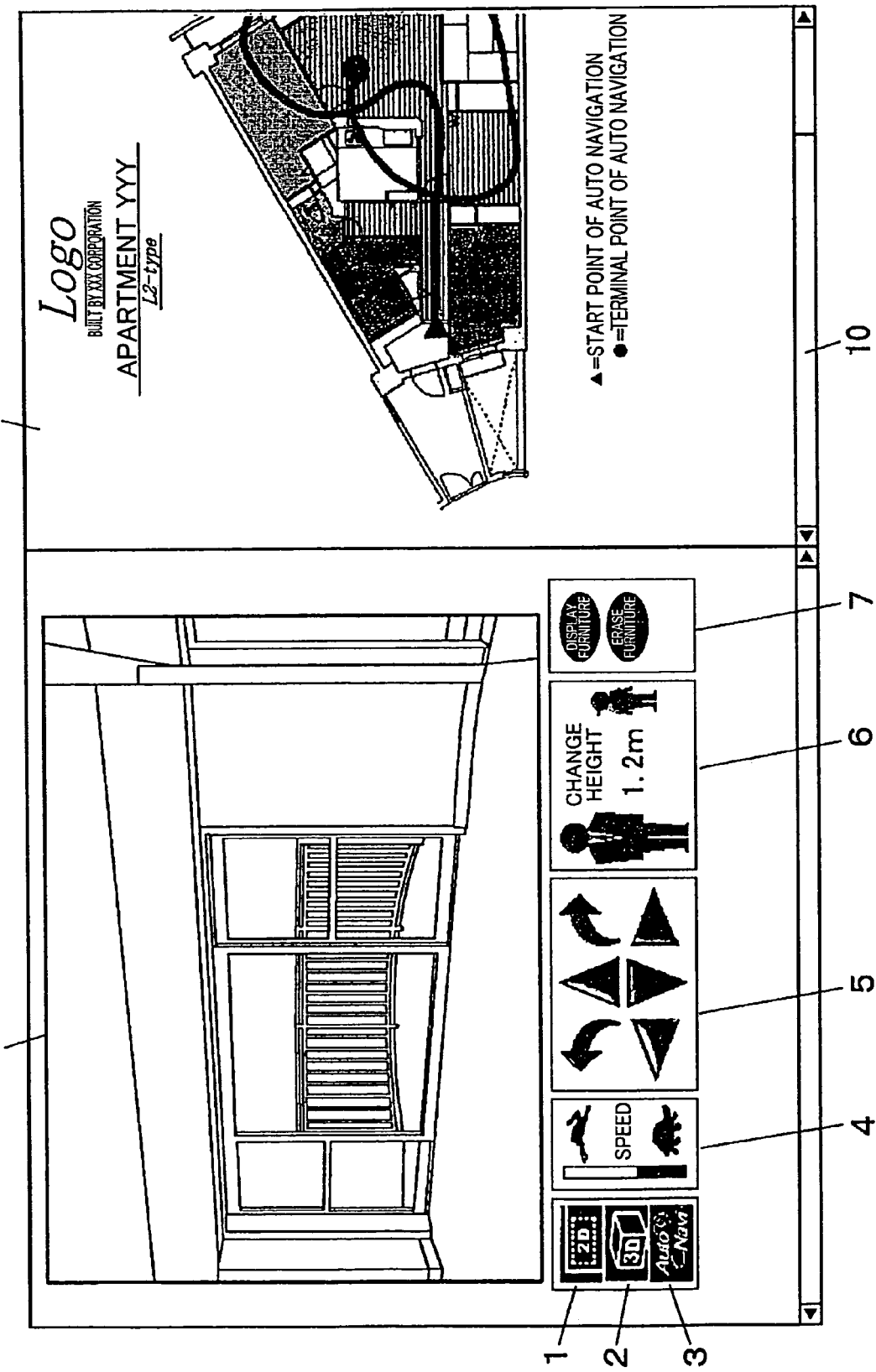
FIG. 9 is an exemplary diagram showing another displayed screen image on the virtual space display system used in this invention.
Figure 10:
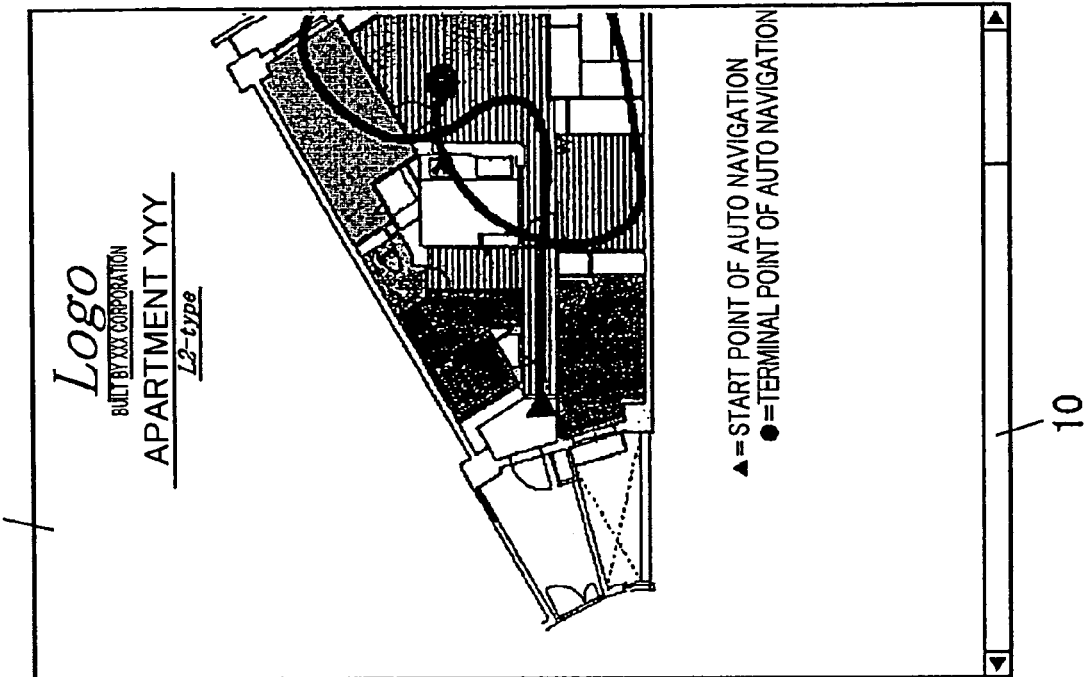
FIG. 10 is an exemplary diagram showing still another displayed screen image on the virtual space display system used in this invention.

The prospective buyer can view the list of registered objects by browsing pages presenting objects on sale provided by the server, as shown in FIG. 5. Clicking on a portion "OBJECT A" or "OBJECT B" on the screen in FIG. 5 by way of a mouse cursor causes the on-screen images as shown in FIGS. 8 to 10 to appear, whereby the prospective buyer can know more details about the objects.

In the case where the buyer wishes to purchase an object, he goes back to the on-screen image in FIG. 5, and clicks on a portion "CONTACT" by a mouse cursor. Thereupon, the information concerning the prospective buyer is automatically or interactively registered in a database DB5 of the server. The information about the prospective buyer may be the ID number of the CPU of his personal computer, or individual information other than the ID number, or information which identifies the prospective buyer (purchaser information). In other words, the server is provided with means for receiving information about the purchaser.

When the purchaser information is registered, the server is functioned to send the seller the contact address of the prospective buyer. In other words, the server is provided with means for transmitting/receiving information necessary for contact. The buyer can select one or more ways of receiving the information in advance. The way includes electronic mail, facsimile number, telephone contact, etc. With this arrangement, the prospective buyer and the possible seller can initiate negotiation relating to selling/purchasing of the object. Alternatively, the server may function to introduce possible sellers to prospective buyer.

In the case where the seller wishes to sell the object by way of auction, the seller can proceed with a negotiation simultaneously with a plurality of prospective buyers. However, when the seller and one of the prospective buyers have reached an agreement of one-to-one negotiation, the other persons' accessing the object registration database DB4 of the server to browse the data concerning the object under the sales negotiation can be barred upon instruction (notice) from the seller or upon instruction (notice) from the buyer under the conditions that the buyer has deposited a certain guarantee money. In other words, the server is provided with means for receiving such a notice during negotiation.

Upon completion of the negotiation, the server receives an indication from the buyer or the seller that the sales contract has consummated. Thereupon, information concerning the contract is registered in a database (database storing sales contract completion information) DB6 of the server. The sales contract completion information includes the contact address of the buyer, the date of contract, and layout of the object. This information is utilized when time has come to require reforming of the housing.

At the same time, data concerning registered suppliers supplying commodity necessary for a housing such as furniture and interior-related commodity (e.g., wall paper) are read from the database DB3 according to the layout and ranking of the object for which the sales contract has been completed, and information about the buyer is transmitted to these suppliers. Thereby, the suppliers can send advertisement about furniture and the like to the buyer through electronic mail or postal direct mail. In the case where the buyer visits the virtual furniture display room as shown in FIG. 6, and orders the commodity, the supplier will receive a profit. Accordingly, the suppliers may be requested to pay advertisement fees and presentation fees to a system administrator. In this case, the buyer and the seller are free from the burden of paying commission fee to the system administrator. Also, the system can be managed by advertisement fees from the suppliers. As will be discussed, later, the virtual furniture display room or its equivalent functions as a database for storing furniture display data and interior display data which are displayable by the browser on the personal computer of the buyer or the like. This database constitutes part of the server.

Figure 2:
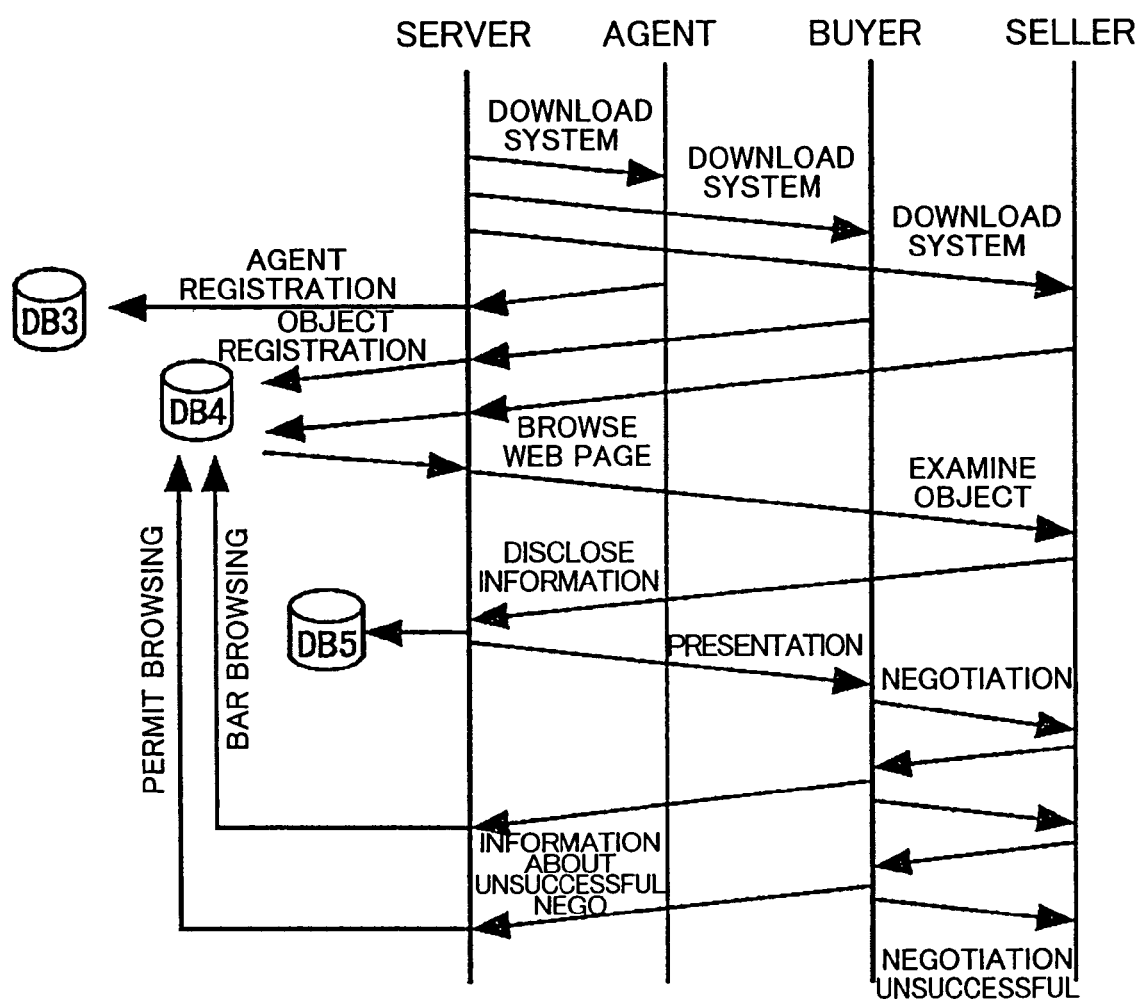
FIG. 2 is an exemplary diagram showing another flow of the inventive method.

Next, FIG. 2 shows a flow when the negotiation has been unsuccessful. In this case, when information that the negotiation has been unsuccessful is transmitted to the server, browsing of the object through the object registration database DB4 is authorized for every one. In this case, information about the price zone within which the prospective buyer would like to purchase the object and objects which they would like to purchase may be publicized so that the agents and the other possible sellers can browse under permission of the prospective buyer.

Figure 3:
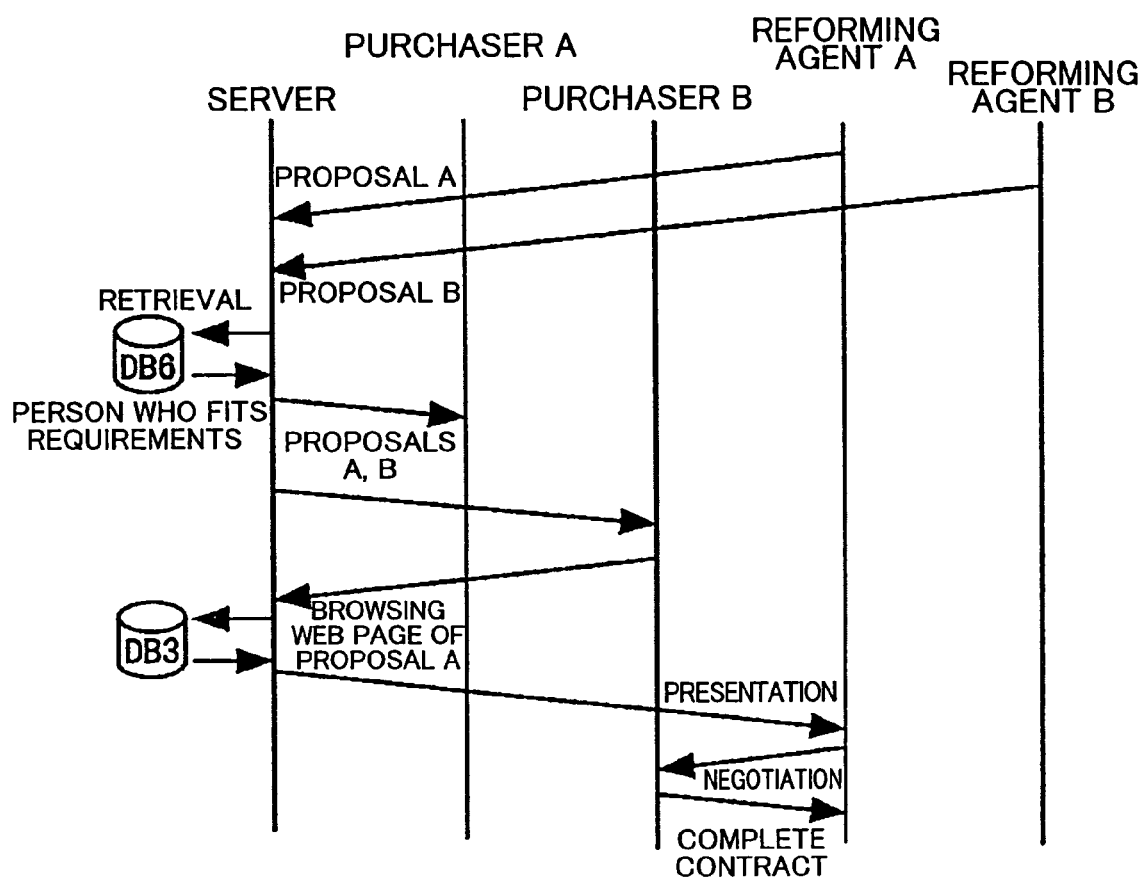
FIG. 3 is an exemplary diagram showing still another flow of the inventive method.

Next, FIG. 3 shows a flow of a case that information about the purchasers which have been registered in a database DB6 are retrieved to propose the purchasers reforming of housing through electronic mail or the like when time has come for reforming of the purchased object or when it is about the time that the family make-up of the purchaser be changed.

The server calculates the reforming proposal time by referring to the contract completion date stored in the database DB6, presents layout information about each of the objects to dealers handing reforming, and instructs the dealers to prepare reforming plans for each of the objects well before the reforming proposal time. Then, the server sends reforming proposals A and B as shown in FIG. 7 to each of purchasers X and Y. Let it be assumed that the purchaser X did not respond, and the purchaser Y showed interest in the proposal A. Then, the server functions to inform the dealer who prepared the proposal A of the result that the purchaser Y showed interest. With this configuration, the reforming dealers are enabled to store a variety of reforming plans which had been prepared before in the database DB6, and propose some exemplary plans to the server when time has come to do so. Then, the server functions to retrieve data about the purchasers who purchased the objects having substantially the same layout and facility corresponding to the proposed reforming plans from the database DB6. In other words, the server is provided with reforming proposal time calculating means, reforming plan storing means, and reforming plan presenting means.

Next, tools shown in respective diagrams of FIGS. 4 through 7 are described. FIG. 4 shows an exemplary on-screen image of the object registration tool used by the possible sellers in registration of objects. In FIG. 4, reference numeral 21 denotes an object image displayed on the screen of a computer, 22 denotes a section for selecting parts, 23 denotes a scroll bar, 24 denotes a section for selecting materials, 25 denotes a section for selecting grid densities, 26 denotes a registration button, and 27 denotes grids. In this example, one grid corresponds to half a size of a "tatami" mat. By manipulating the grid density selecting section 25, grids having a higher density are displayed. The parts selecting section 22 enables the operator to select parts such as Japanese style room, western style room, sink cabinet, corridor, veranda, door, and closet. For instance, in the case where a Japanese style room is selected, parts such as "Japanese style room of 4.5-tatami mat" and Japanese style room of 6.0-tatami mat" are displayed orderly at a lower part of the parts selecting section 22. Selecting desired parts by manipulating the scroll bar 23 and paste the parts image on the object display screen 21 by drag & drop operation enables the operator to input layout of the object as shown in FIG. 4. Manipulating the material selecting section 24 enables the operator to select the material for floor, wall, ceiling, etc. of the room displayed on the object display screen 21. For instance, corridor tile, flooring, carpet, etc. are selectable as the material for floor. When a sketch drawing of the object is completed, the operator presses the registration button 26. Then, the object is registered as "OBJECT C" in the section of "UN-REGISTERED" in FIG. 5. The object under registration has its object number automatically allocated at the time of storing and publication of the object data. Also, a password is issued to enable a specific person to authorize ban and permission of browsing of the object data.

In this way, the aforementioned configuration enables any one, at any time to utilize the inventive system of presenting and selling real estate objects, without the need of purchasing a device specially designed for the system such as a CAD and without the knowledge of system configuration by using the data registration tool downloadable from the network. Further, this configuration enables the user to utilize a most updated version of housing simulation software at a low cost by registering the data about the house of the user himself.

In this embodiment, the object registration tool is shown as a tool for implementing the system. Alternatively, the seller may input furniture he would like to sell. In this case, the furniture is displayed in a virtual furniture display room as shown in FIG. 6. When the user would like to sell other commodity related to sales of the real estate object, information concerning electric appliances such as refrigerators, washing machines, dish washers, large-sized TV sets may be registered. In sum, this configuration enables to publicize the data registration tool on the Internet for allowing users to browse web pages on the Internet, enables any one visiting the web pages to input furniture and object they would like to sell, enables them to allow presentation of objects on the web pages introducing the objects by pressing the publication button provided on the data registration tool, and thus enables any one to view the objects.

FIG. 5 is an exemplary diagram showing an on-screen image of a web page introducing or presenting objects on sale. On the screen, displayed are a list of objects, information about the sellers, and terms and conditions for sale (such as price). Prospective purchasers can contact the sellers by electronic mail. Let it be assumed that a prospective buyer is interested in object B offered by Company b, and clicks on the button "OBJECT B" with a mouse cursor. Then, the image as shown in FIG. 8 is caused to appear on the screen of the computer of the user (prospective buyer).

FIGS. 8 through 10 are diagrams respectively showing exemplary images displayed on the screen according to an object display system of this invention. In the respective drawings, reference numeral 1 denotes a two-dimensional image display button, 2 denotes a three-dimensional image display button, 3 denotes an automatic viewpoint shifting button, 4 denotes a shifting speed setting/displaying section, 5 denotes a manual viewpoint shifting button, 6 denotes a viewpoint up & down button, 7 denotes a furniture display on/off button, 8 denotes a 2D/3D image rendering area, 9 denotes an object display area, and 10 denotes a scroll bar. As shown in the system configuration in FIG. 11, these screen images are displayed on the monitor screen of a personal computer. Clicking on a viewpoint control menu on manipulating sections 1 to 7 with a mouse cursor enables a user to freely change the viewpoint based on what he wants to verify. FIG. 12 is a flowchart showing an operation when the left-side button of a mouse is clicked on. 2D image display, 3D image display, automatic viewpoint shifting, control of viewpoint shifting speed, manual viewpoint shifting, turning of line of sight, up & down of viewpoint, ON/OFF manipulation of furniture display, etc. can be implemented based on a judgement as to which button has been manipulated on the viewpoint control menu. With this configuration, the user can verify the designing plan from his viewpoint depending on activity level of his lifestyle. This configuration provides a user-friendly interface in such a manner that the configuration not only provides an environment feasibly operable for the user not skilled in manipulation of the computer but also prevents an experienced operator from being imparted with unnecessary stress during manipulation of the viewpoint shifting. Thus, the configuration provides an environment that enables the user to concentrate on designing and verification.

First, the manipulating section for changing the height of viewpoint is described. The manipulating section 6 in FIGS. 8 through 10 depicts an image of "ADULT" and "CHILD". Between these two images, the height of current viewpoint is displayed in terms of a numeric value. In this example, pressing the button "ADULT" elevates the viewpoint by 10 cm stepwise. Conversely, pressing the button "CHILD" lowers the viewpoint by 10 cm stepwise. Display of viewpoint height is changed each time as the aforementioned operation is conducted.

Thus, setting the manipulating section through which the user changes the viewpoint height enables the user to verify the entirety of the house from respective viewpoints of family members such as adults, children, infants, and elderly people. This configuration enables to verify locations having a possibility of danger for them in advance. Further, this configuration enables the user to simulate what his life would be in the future, thereby helping the user plan designing considering reforming in the future. Change of the viewpoint height enables to automatically set the angle of line of sight relative to the horizontal plane (such as angle of elevation and angle of depression) depending on the height of viewpoint. For instance, generally, tall persons have a habit of walking with their heads inclined a little downward, and children tend to look a little upward. This configuration enables to display these different viewpoints, thereby aiding smooth viewpoint shifting in the space.

Next, a manipulating section for changing the viewpoint shifting speed is described. The manipulating section 4 in FIGS. 8 through 10 depicts images of "RABBIT" and "TURTLE". Manipulating a slide bar on the left side of these figures enables to adjust and display the speed of viewpoint shifting. Pressing the button "RABBIT" increases the shifting speed, and pressing the button "TURTLE" decreases the shifting speed, thus implementing speed change stepwise. Manipulating the slide bar enables to continuously change the speed. Stepwise speed designation enables the user to designate various speeds ranging from infant (toddling)–elderly people (slow pace walking)–child (intermediate pace walking)–adult (fast pace walking)–child (running).

In this way, providing the manipulating section 4 for changing the viewpoint shifting speed enables the user to verify the space from different viewpoints such as the viewpoint of a child running around and the viewpoint of an elderly person moving in a slow pace. Further, this function can be utilized in adjusting the shifting speed depending on the utility environment of the system other than the inherent function of changing the shifting speed of the viewpoint depending on the degree of activity. Specifically, in the case where the system is utilized in an environment of low performance, high speed shifting mode is utilized, whereas in the case where the system is utilized in an environment of high performance, low speed shifting mode or high speed shifting mode is selectively used, whereby a function of swiftly moving to the destination is effectuated.

Next, a manipulating section for changing over 2D image display and 3D image display is described. Manipulating 2D (two-dimensional) button 1 shown in FIG. 8 or 9 enables to display an image in the 2D/3D image rendering area 8 as a two-dimensional image as shown in FIG. 10. In FIG. 10, the viewpoint location in terms of a three-dimensional display is shown by the butterfly mark flying in the virtual space, and the direction of line of sight in terms of a three-dimensional display is shown by the arrow C. The angle of field of view is defined by straight lines L and R. Straight line L denotes the leftmost end of field of view in a three-dimensional display, and straight line R denotes the rightmost end of field of view in a three-dimensional display. Further, manipulating 3D (three-dimensional display) button 2 in FIG. 10 enables to display an image in the 2D/3D image rendering area 8 as a three-dimensional image as shown in FIG. 8 or 9. At this time, the image is displayed in the image rendering area 8 from the viewpoint, in the direction of line of sight, and at the angle of field of view in terms of a two-dimensional display. The viewpoint may be shifted by implementing drag & drop operation with respect to the butterfly mark B, and the direction of line of sight may be changed by dragging the distal end of the arrow C.

Thus, providing the manipulating section for changing over two-dimensional display and three-dimensional display enables to implement the following operation. Pressing the 2D display button after shifting the image in a three-dimensional virtual space enables to present a virtual space represented in a bird's eye view, while displaying a position marker [location at which the viewer virtually stands in the three-dimensional virtual space (butterfly mark B) and orientation in which the viewer virtually directs his line of sight (arrow C, etc.)]. This configuration is effective in grasping where the viewer is located with respect to the entire space when virtually moving in the three-dimensional virtual space. There is a technique of displaying a two-dimensional plane simultaneously with a three-dimensional video image. However, since this technique involves two different kinds of video image drawing, there rises a problem such as time lag in rendering two different kinds of images with a computer machine operated at a low speed (i.e., machine of low performance) and under the environment on the Internet. Accordingly, the aforementioned unique method proposed in this invention is remarkably effective in utilizing the system under the current environment on the Internet and the current computer machine environment.

In the two-dimensional image display mode (state of bird's eye view), moving the position marker enables to easily change the viewpoint to a location where the viewer wants to verify the status of activity (such as what the activity would be like when standing at the kitchen, and what the activity would be like when going in and out of the front door). At this time, the user can designate the location by pointing the destination on a layout map not based on the idea of viewpoint shifting but based on the idea of marker replacement. Thereby, the configuration effectuates a user-friendly interface considering users who are not skilled in grasping an image in a three-dimensional space.

Next, a manipulating section for changing over ON/OFF of furniture display is described. It should be appreciated that furniture is not displayed in a three-dimensional virtual space on the 2D/3D image rendering area in FIG. 8. Pressing "ARRANGE FURNITURE" button on the manipulating section 7 in the state shown in FIG. 8 enables to change the state to a state of FIG. 9 in which furniture is displayed. Pressing "ERASE FURNITURE" button on the manipulating section 7 changes the state of FIG. 9 to the state of FIG. 8 where furniture is not displayed.

Changing over the state between furniture display and furniture non-display enables the user to verify the state of the room by arranging or erasing furniture depending on situations such as change of the arrangement of the furniture after purchase of the furniture. Also, this configuration enables to utilize the operation of ON/OFF of furniture display in association with speed adjustment of viewpoint shifting. Specifically, with this configuration, viewpoint can be shifted smoothly while furniture display is turned off even if a computer is of low performance. In such a case, the user may turn on furniture display after confirming that he moved to the location where he wants to verify. Then, furniture is displayed again. It may be preferable to store data regarding furniture in a cache memory once such data has been read. With this arrangement, the user is free from a stress due to frequent on-and-off operations of displaying furniture, thereby providing a more comfortable verification environment.

Next, a manipulating section for changing over automatic viewpoint shifting and manual viewpoint shifting is described. The manipulating section 3 in FIGS. 8 through 10 is the section for automatic viewpoint shifting. Pressing "AutoNavi" button in the drawings automatically shifts the viewpoint or navigates the viewer in the space along the route shown by the solid bold black line on a layout map of the object displayed in the object display area 9. The mark ▲ in the drawings indicates the start point of the automatic viewpoint shifting, and the mark ● indicates the terminal point thereof. The manipulating section 5 in FIGS. 8 through 10 is a section for manual viewpoint shifting. The section 5 includes four triangular-shaped buttons for shifting the viewpoint B forward, backward, rightward, and leftward respectively, and two arrow buttons respectively pointing leftward and rightward in round curves for changing the orientation of line of sight. The arrow buttons correspond to the arrow C. Manipulating one of these buttons suspends automatic viewpoint shifting, and changes over to manual viewpoint shifting.

Thus, changing over automatic viewpoint shifting and manual viewpoint shifting enables the following operation. Automatic viewpoint shifting is utilized to navigate the viewer to the viewpoint from which the viewer wants to verify what the activity would be like at the place. Once the desired viewpoint is found, the viewer may change over to manual viewpoint shifting. In the automatic viewpoint shifting, viewpoint is sequentially shifted from one place to another in the entire space of the house (object) to verify what the activity would be like at the place. With this configuration, when the viewer finds the desired viewpoint in the automatic viewpoint shifting, he changes over to the manual viewpoint shifting thereat. Then, the viewer can easily carry on verification, thereby concentrating on the verification.

Entirety or part of the system of displaying a virtual space can be downloaded from a remote server to the computer of a user through a network to thereby effectuate the aforementioned configurations. Specifically, publicizing object data and a program for implementing the inventive system for the purpose of presenting real estate objects enables any one, from any where to virtually verify the objects without visiting the actual site and even more enable to virtually verify objects whose construction has not been completed. In this way, the inventive system can be utilized as advertisement of real estate objects, and is effective in collecting prospective customers at a lower cost than what has been required in the conventional sales system which necessitated model housings (model rooms). In the case where prospective purchasers live in a remote region from where the model housings stand, or are in a situation where information regarding objects which they would like to purchase is not easily accessible because they live in a region beyond the reach of information providers, they can verify the objects by utilize the system.

Further, utilizing the inventive system enables the user to simulate different situations considering the lifecycle of persons (purchasers) living in the house (such as transition to barrier-free environment in the future, and increase/decrease of the number of rooms depending on the change of family members) in advance, prior to purchase. Also, utilizing the system enables the customers who purchased the objects quite a few years ago to be suggested of reforming and be provided of reforming plans through the Internet.

Figure 11:
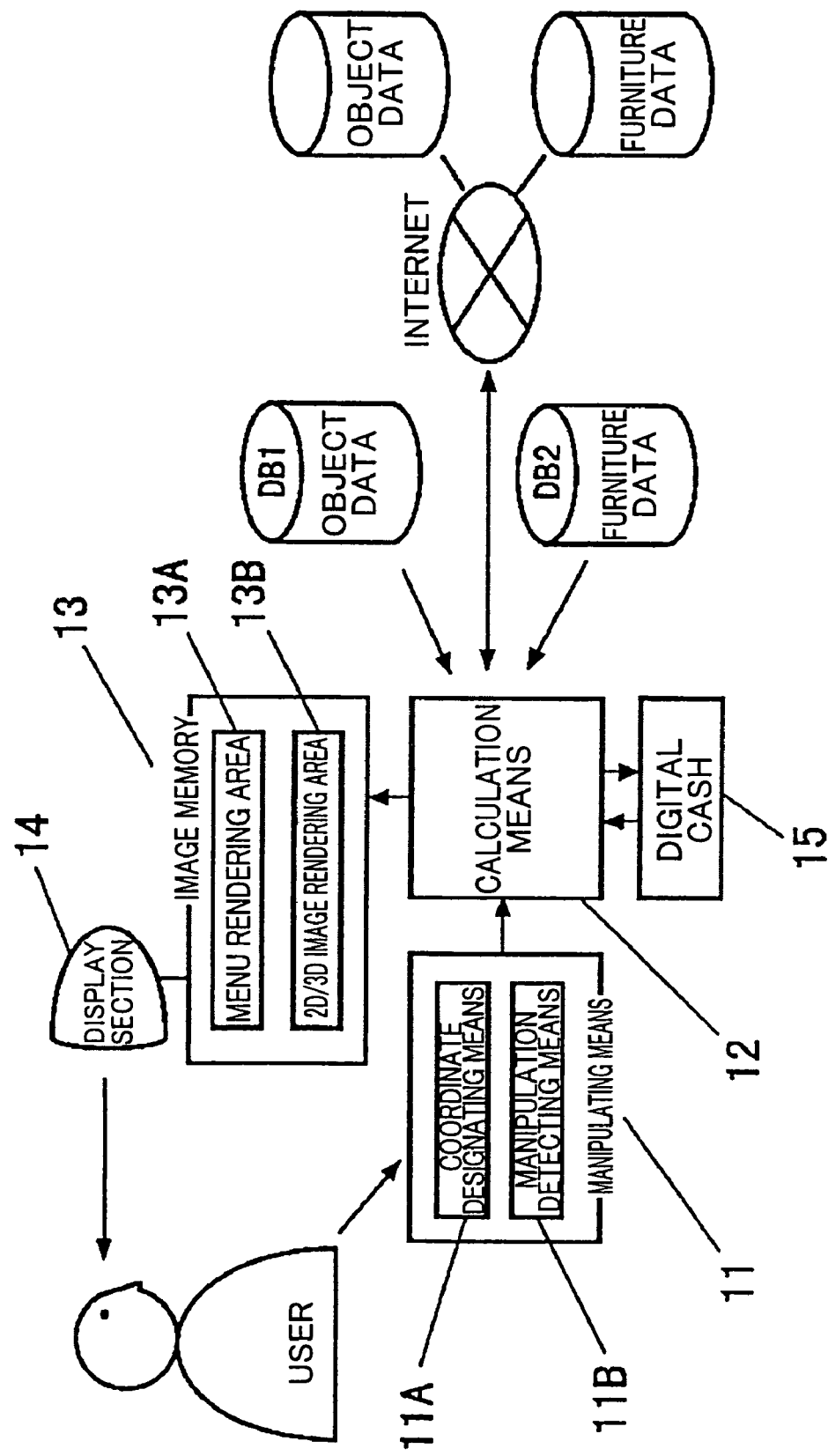
FIG. 11 is a schematic diagram showing a configuration of the virtual space display system used in this invention.
Figure 12:
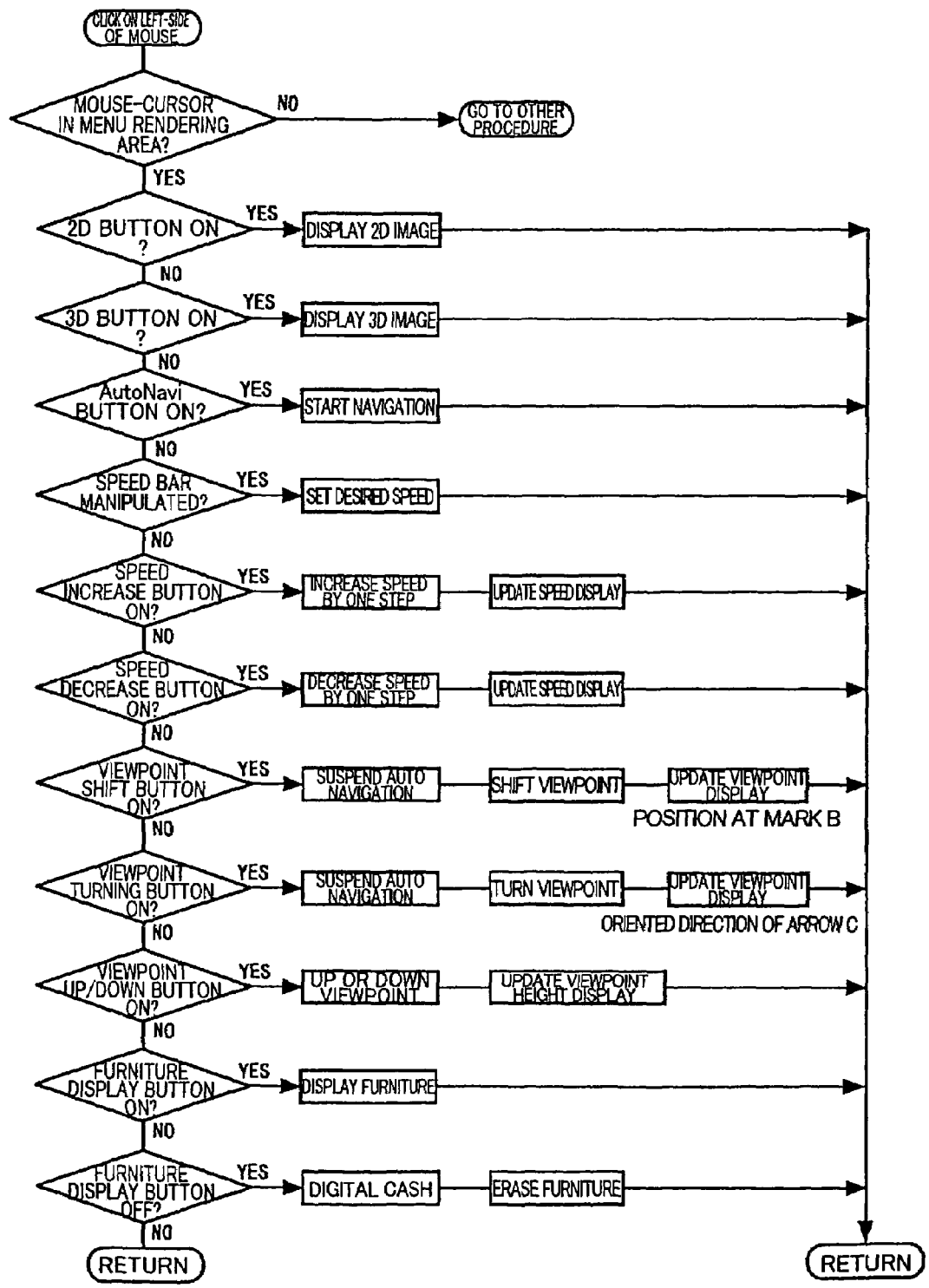
FIG. 12 is a flowchart showing operations of the virtual space display system used in this invention.

FIG. 11 is an exemplary diagram showing how the inventive system is used with a personal computer of a user. A manipulating means 11 includes a coordinate designating means 11A for designating the coordinate on the screen of the computer, and a manipulation detecting means 11B for detecting the manipulation at the designated coordinate. A mouse, a mouse driver, etc. of the personal computer constitute the manipulating means 11. A microprocessor of the personal computer and an application software operated on the operating system thereof constitute the calculating means 12. An image memory 13 is loaded on a graphic board or its equivalent of the personal computer. Writing image data on a menu rendering area 13A and a 2D/3D rendering area 13B of the image memory 13 enables an image shown in FIGS. 8 through 10 to be displayed on a display section 14. A hard disc of the personal computer, MO, DVD or its equivalent constitutes a database DB1 (DB2) to store three-dimensional data regarding objects (furniture). These data are also downloadable from databases of different suppliers through the Internet. Furniture data which has been displayed on the screen is stored in a cache memory 15 which is accessible at a high speed, when furniture display is turned off.

Utilizing the inventive system enables general consumers to verify and search objects on the Internet without going to the actual site. Further, since object data are distributed via the network, customers can view a most updated object data on the Internet. Furthermore, the customers can verify the object data by a most updated software.

FIG. 6 is an exemplary diagram showing a screen image of a furniture display room. In the inventive system, there is prepared a virtual furniture display room for enabling prospective customers and possible sellers to register furniture. Prospective customers automatically arrange furniture data which they themselves registered in the display room. In FIG. 6, reference numeral 30 denotes a 3-dimensional rendering area in the furniture display room, 31 denotes a display section for displaying keywords for evoking images to retrieve furniture data, 32 denotes a manipulating section for shifting viewpoint and changing installation position and orientation of furniture in the display room, 33 denotes a button for returning the displayed screen image to the menu screen image before the furniture display room is displayed, and 34 denotes a button to go forward to furniture arrangement. This configuration enables a visitor visiting the virtual furniture display room to change layout of the furniture by selecting a desired classified category of furniture which he wants to view. In the case where the visitor does not select a specific category, the system allows to display different categories of furniture at random. There is prepared a menu with which the visitor can purchase furniture displayed on the display room by mail order. This configuration is effective in that the prospective purchaser can select furniture of a suitable size intuitively and properly purchase the furniture compared to a case where furniture is presented in photographic data. This configuration also enables to invoke any real estate object on the display room from the menu, and select furniture while virtually arranging them in the interior of the housing which the prospective purchaser plans to purchase. With this configuration, determination as to which commodity is necessary accompanied by purchasing of a real estate object can be simultaneously implemented by arranging different kinds of furniture in a three-dimensional virtual space.

Also, there is provided a menu for automatically retrieving similar commodity to what a prospective-purchaser would like to buy in the case where he cannot find furniture which he wants to purchase in the display room. In this case, a prospective purchaser registers what he wishes to buy on the retrieval menu. Upon inputting of the data on the retrieval menu, the system functions to instruct registered users to search similar commodity by automatically sending the users query mails. When commodity just fitted for the purchaser is found, the purchaser is automatically notified accordingly.

FIG. 7 is an exemplary diagram showing an image screen of a reforming proposal. On the screen, the purchaser, who purchased an object (housing) and at a time of reforming can view a reforming proposal image in the title of "REFORMING PLANS FOR MR. X" by using the virtual space display system shown in FIGS. 8 through 12. When the purchaser selected the reforming type on the screen, he is invited to virtually experience what would be done in a three-dimensional virtual space. When the purchaser plans to do reforming after virtually experiencing the reforming and presses the button "CONTACT", the system functions to contact a plurality of pre-registered reforming dealers (suppliers). The cost for reforming is displayed in terms of reference cost. Alternatively, the system may function to search for a supplier who can satisfy a cost demanded from the user by asking a plurality of suppliers to submit their estimates at one time, or determine a final agreed cost by bidding, or arrange consultation services for the user.

Figure 13:
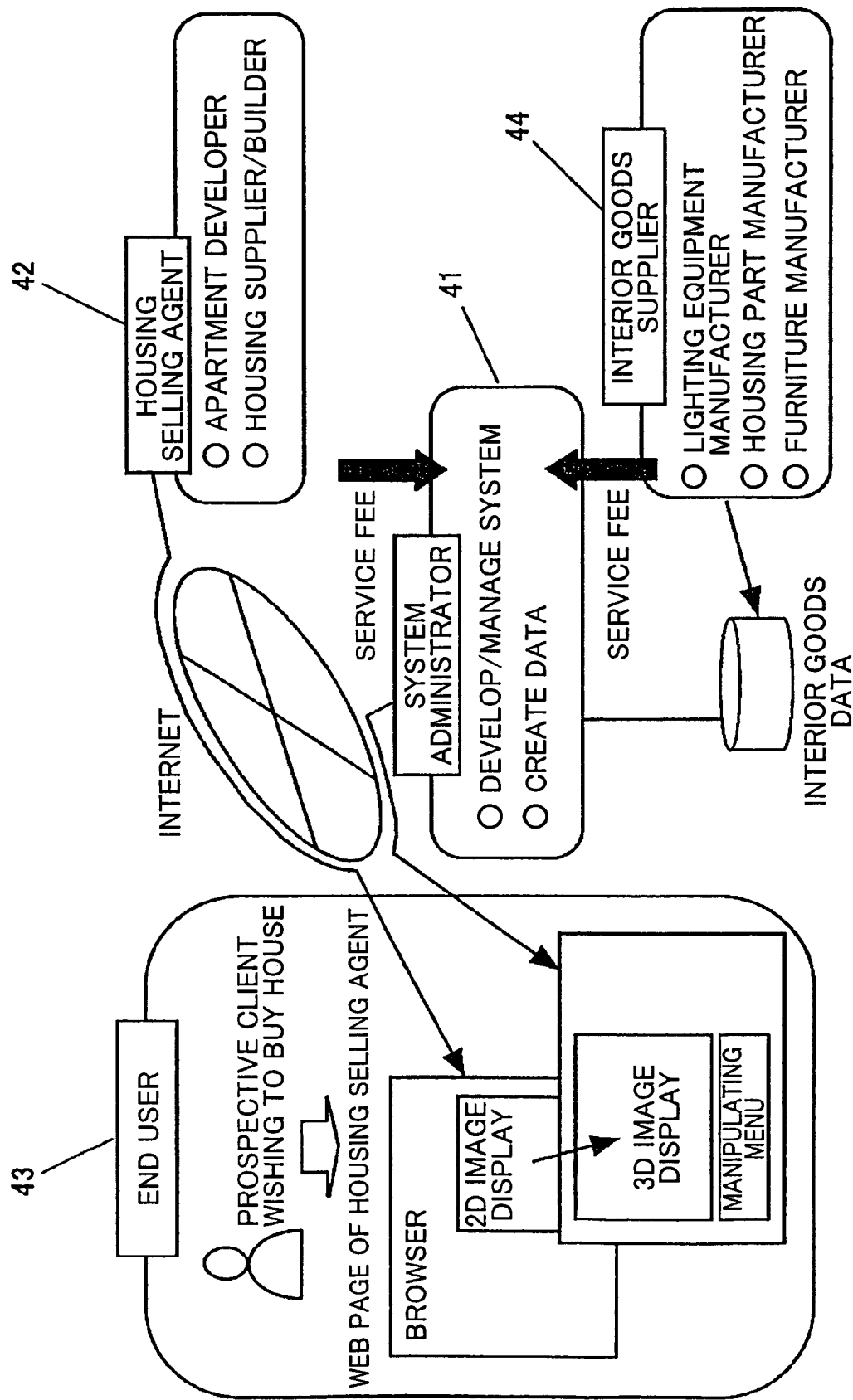
FIG. 13 is a schematic diagram showing a configuration of the inventive sales support system.

FIG. 13 is a summarized diagram explaining how services are provided to corporations engaged in housing-related business with respect to virtual experiences regarding layout and simulation of arrangement change of interior commodity on the Internet. In FIG. 13, reference numeral 41 denotes a system administrator, 42 denotes a housing dealer, 43 denotes an end user, and 44 denotes an interior commodity supplier. The system administrator 41 is a provider who develops and manages the inventive system, and may additionally provide services of creating and registering 3D data on behalf of suppliers. The housing dealer 42 includes apartment house developers, housing suppliers, and housing builders. The end user 43 includes persons who utilize the system (browse objects) and prospective customers planning to buy houses. The end user 43 browses web pages of the housing dealers, virtually experiences the inside of objects by manipulating the aforementioned virtual reality experiencing system, and arrange and edit interior commodity. Data regarding interior commodity are provided by the interior commodity supplier 44. The interior commodity supplier 44 includes lighting equipment manufacturers, housing parts manufacturers, and furniture manufacturers.

Hereinafter, various examples of sales methods of housing-related commodity by using the system shown in FIG. 13 and ways for charging are described.

First, in the case where a real estate agent presents objects to prospective purchasers, there is a method according to which at least one of a system provider and a data registration agent charges the real estate agent at least one of fees for registering three-dimensional configuration data of objects, fees for registering data regarding pieces of furniture, and fees for allowing the real estate agent to use the inventive system.

With this method, even if the real estate agent does not have a system or technology to register three-dimensional configuration data, this system can provide services of letting consumers view a three-dimensional virtual reality space of objects. The interior of the objects can be presented through the virtual space on the Internet which has not been accomplished in the conventional technology in which the real estate agent had to construct model housings (rooms) to let the prospective purchasers actually experience the interior of the housings. Thereby, cost for constructing model housings can be omitted, and services for presenting interior of the housings to the customers can be supplied at a low cost. Sales cost reduction due to omission of model housing resultantly lowers sales price to be offered to the consumers. According to this service, real estate agents are free from work of developing, purchasing, and distributing a system which allows users to browse virtual model rooms, thereby enabling the users to obtain services at a low cost because expenses for such a work are not required.

There are cases that the system provider registers three-dimensional configuration data as well as system administration, and that other suppliers create three-dimensional configuration data. Accordingly, there are different ways of charging owing to a variety of services available.

Alternatively, it may be possible to charge each time data is registered with respect to fees for registering three-dimensional configuration data of objects and fees for registering furniture sets. This method enables real estate agents to use virtual model rooms in place of actual model rooms.

With this method, for example, budget for constructing a set of model rooms for one building of apartment houses which has been required in the conventional technology is usable as budget for virtual model rooms. Accordingly, the users can use the services of the inventive business method relatively easily considering budget plans and accounting systems. Regarding registration fees for furniture sets, the users can use the services relatively easily because budget which has been estimated for constructing actual model rooms which involves expenses for preparing different sets of furniture and taking photographs for the model rooms, can be used for such registration fees.

Even in the case that data which has been prepared by real estate agents is utilized, the aforementioned charging manner can be applied.

According to the aforementioned method, real estate agents can save expenses for data creation and secure data accuracy by utilizing CAD data which have been used at a time of designing again. Further, the system administrator can earn money through data registration fees and system utilizing fees without a burden of creating data.

System utilizing fees can be charged based on the period of utilizing the system, the number of accesses to the system, the number of requesting information (brochures), and access increasing rate to the entirety of web pages utilizing the inventive system. According to this method, the idea of charging for the system utilizing period corresponds to the idea of providing staffs in actual model rooms.

According to this business method, completing sales in a short period enables to suppress sales cost. Compared to the method of paying cost required for initial stage of sales at one time, this method enables the user to gain services at a lower price. The method of charging based on the number of accesses to the system is a proper charging method for real estate agents who are doubtful in the effect of advertising on the system. In other words, according to this method, the effect of browsing information is measured in terms of the number of accesses, and the real estate agents pay for the effect of browsing. This method may be a risky charging method for the system provider because less effect results in reduction of income. However, this method encourages the system provider to improve services such as system precision improvement and is effective in advertisement on the Internet. In the case where the number of accesses is exceedingly large, the real estate agent may suffer from enormous amount of charges. In view of this, it may be desirable to set the upper limit for charging.

It may be possible to charge based on the number of contracts which have been completed by using the inventive system, and the number of visitors who have visited the virtual model rooms, in place of charging based on the system utilizing fees.

This charging method imposes the system provider a demanding evaluation. However, the evaluation system that result is rewarded is a fair charging system for users. In this case, it may be possible to set the charging in such a manner that a certain % of the sales amount or profit is charged. For instance, it is a general practice that a real estate agent advertises objects of a plurality of real estate proprietors for free. After a contract is completed, the proprietor pays the real estate agent commission fees. It may be preferable to adopt the current commercial practice to what is to be implemented on the Internet considering affinity in the field of real estate business. It should be noted that charging based on the number of visitors visiting the virtual model rooms is implemented by distributing questionnaires to the visitors and charging based on the number of responses replying that the visitors identified the objects through the inventive system.

Further, it is possible to charge people who browsed the objects by utilizing the system information providing fees, in place of charging real estate agents. This is a method of charging users who browsed 3D layout information of object.

This method is applicable to a case where information is confidentially provided to users belonging to a certain membership and client enclosure is implemented by providing value added service.

In the case where commodity sold by interior commodity suppliers and housing parts suppliers are presented in a display space displaying an object having an appropriate layout by utilizing the inventive system, it may be possible to charge the interior commodity suppliers and parts suppliers fees for presenting commodity in a virtual reality space. This is a method of charging when housing-related-parts suppliers and interior commodity suppliers utilize the inventive system.

According to this method, the suppliers can utilize the inventive system as a means for advertising commodity or as a sales tool. In the case where there is a provider of providing three-dimensional configuration data, such provider may be the one other than the real estate agent or may be the real estate agent itself. In any case, fees for utilizing services are charged to the system utilizing person (real estate agent, or other business dealer) so that the fees be paid to the system provider in addition to fees for registering three-dimensional configuration data. In any case, this is a method of charging fees for presenting commodity in a virtual reality space.

It may be possible to charge commodity presenting fees to interior commodity suppliers and housing-related parts suppliers based on the number of presentation and the period of presentation.

This method enables the service provider to charge in two different ways of charging fees for virtualizing and publicizing fees by independently charging the virtualizing fees. Thereby, the service provider is enabled to manage a business of virtual reality image processing at a low price, while securing profits through the presentation fees. In this way, users can prepare a multitude of commodity to be displayable in a virtual reality space and flexibly utilize the system by presenting what is needed from time to time, thereby efficiently utilizing the budget for virtual reality image processing. Further, since virtual reality image processing can be carried out independently, and advertisement and sales on the Internet can be managed solely relying on system utilizing fees, versatile services can be provided.

It may be possible to charge interior commodity suppliers and housing parts suppliers based on sales profits, the number of accesses, and the number of browsing information regarding the interior commodity and the parts. Specifically, the system utilizing fees can be charged as rewards for sales profits, the number of accesses, browsing fees for more detailed information about the commodity and parts, and fees for requesting brochures (information).

The aforementioned different methods enable to clarify a correlation between cost and effect, thereby encouraging use of the system.

In a configuration having a function of creating estimates regarding selected items of commodity, there is a method of charging interior commodity suppliers and parts suppliers based on the number of commodity which have been selected until the estimate is finished. This is a method of reward-motivated charging system mentioned above, and is a method of charging for items of commodity listed in the estimate.

This method provides service much closer to actually practiced service in selling commodity.

In each of the aforementioned methods, charging can be performed based on a certain percentage with respect to the actual selling price. This is a method of setting service charge for the sales price of commodity in place of virtualizing fees which are determined based on manpower fees.

The above method provides service advantageous for sellers who want to order (present) a small number of commodity.

It may be possible to charge relating to buying and selling of interior commodity at the same time of charging relating to buying and selling of real estate objects which has been described above. This method is suitable to charging for services enabling simulation and selling of parts and interior commodity on web pages of selling real-estate-related objects. Combining different types of charging methods enables all the staffs using this system to gain qualified services at a low price.

In the case where the inventive system is publicized to end users, the end users may be charged based on the system utilizing period and the number of accesses. Specifically, this is a charging method not based on the idea that the inventive system is used as a sales tool or an advertisement tool of commodity and objects, but based on an assumption that end users may allow to simulate changing of interior and layout in a housing or utilize as a moving simulation tool and a layout grasping tool by utilizing a layout image similar to that of a housing to be purchased. At this time, a tool utilizing person is charged fees utilizing the tool. Charging is performed based on the tool utilizing period or the number or accesses, or membership fee is charged. With this configuration, users can utilize a most updated system any time at a low price without purchasing an expensive software application.

In the case where the inventive system is publicized to end users, it may be possible to charge the end users based on the number of commodity which are allowed for browsing. This is a method of charging based on the number of commodity browsable while charges based on the system utilizing period and the number of accesses or system utilizing fees are set free.

This method enables the system provider to earn money for system administration.

In the case where an end user utilized a layout registration tool on the inventive system, or stored registered data in his personal computer, he may be charged. This is a method of charging for the case where the inventive system is operated under a condition that a layout registration software application is added.

In this case, there are methods of charging merely for use of a layout software application, charging merely for storage of data created by the software, and charging for both cases. In any case, charges based on the system utilizing period, and system utilizing fees are free. This is a method of providing user options regarding services. According to this method, charges for utilizing the system as the basic system are free, and the user is charged only when he requests more informative service.

Further, setting a certain free-charge period for using the inventive system enables to decrease stress of users from paying the system utilizing fees, thereby allowing potential users to know services on the inventive system.

There is proposed a method of analyzing information regarding the commodity which the users selected, in association with the generation and sex of the users to create data for marketing and charging for such marketing data. In the system administration according to this method, all the services including system utilizing fees may be made free.

In the aforementioned embodiments, programs and data for configuring the inventive system may be distributed in the format of CD-ROM and DVD-ROM, or may be stored in a hard disc or its equivalent of the server, or may be downloadable to the personal computer of the user via a variety of communications network such as telephone lines, satellite networks and cables of CATV.

As mentioned above, according to the housing-related commodity sales support system of this invention, housing-related commodity such as real estate objects and furniture can be verified and searched. Further, since data are distributed through the network, users can view most updated information at any time, and can verify information by a most updated browser software at any time.

Further, according to this invention, publicized is a data registration tool on the Internet for registering housing display data including layout information of real estate objects, interior display data concerning information about interior of the object (housing), and furniture display data such as configuration information about furniture in a database of the system. With this configuration, any one can register a variety of housing-related commodity on the system any time without purchasing a dedicated device or without knowledge of the system configuration, participate in the business operated by the system as a seller, and utilize the system. Also, this configuration is advantageous for a buyer (purchaser) in the aspect of getting different options of selecting commodity.

Further, according to this invention, a prospective buyer other than the seller and the buyer under negotiation is barred from browsing the object under negotiation. Thereby, there can be prevented a confusion of negotiation resulting from interruption of the other buyer in the negotiation.

According to this invention, a buyer is obliged to disclose his identify to the system administrator prior to start of negotiation to buy a real estate object. This configuration prevents a trouble resulting from transaction with a virtual person who does not exist in the real world.

Further, registering information regarding the purchased object in addition to the information regarding the buyer in the database after a real estate object sales contract is completed enables to use such information as data for reforming proposal.

According to this invention, information regarding a sales contract of a real estate object is stored in the database after the sales contract is completed. Reforming time can be judged based on lapse of time (years) after buying of the object or on determination as to whether it is about the time that the family member be changed, referring to the above stored information to thereby propose the buyer reforming plans. Further, presenting reforming plans on web pages invokes a third person's interest even if the reforming plans may not attract the buyer. This is advantageous to avoid a result that the proposal may be provided in vain.

Providing a function of accessing to a site of virtual display sales through the browser on the terminal of a personal computer of a prospective purchaser enables to provide a configuration in which the personal computer is linked to the site of virtually displaying and selling furniture. Thereby, the purchaser is enabled to arrange the furniture in a three-dimensional virtual space to more accurately grasp what the real estate object would look like. Further, furniture necessary in an object (housing) which the purchaser plans to buy can be ordered at the same time of purchasing the object.

Providing the browser and the data registration tool in the form of a computer-readable storage medium enables to save time required for downloading the browser of the inventive system on the Internet, thereby saving communication fees for users. Further, distributing the data by storing the data in a CD-ROM and attaching the CD-ROM to housing magazines as appendix enables to expedite recovery of cost required for developing the system. Further, distributing the data through worldwide media enables to promote utilization of the system.

As mentioned above, this invention according to an aspect is directed to a housing-related commodity sales support system capable of providing information regarding housing-related commodity to a terminal of a computer of a prospective purchaser via a network system, comprising: a database which stores housing display data including information regarding a layout of a housing; browser providing means which provides the terminal of the computer of the prospective purchaser with a browser, and a second display section which displays a viewpoint manipulating menu with which a user manipulates a viewpoint in the virtual space; and data transmitting means which transmits the housing display data stored in the database to the terminal of the computer of the prospective purchaser via the network system upon request from the browser provided on the terminal of the computer of the prospective purchaser. The browser including at least a first display section which displays an interior of the housing as a three-dimensional virtual space based on the housing display data.

Further, the inventive system has the feature that the database is so configured as to store the housing display data in conjunction with information regarding an object of real estate.

The inventive system further comprises means which receives a notice that a sales negotiation relating to the real estate object is in progress from a terminal of a computer of a seller selling the real estate object or the terminal of the computer of the prospective purchaser, wherein the data transmitting means is so configured as to bar transmission of the housing display data correlated with the real estate object to a terminal of a computer of a prospective purchaser other than the prospective purchaser who is in progress of the sales negotiation upon receiving the notice.

The inventive system further comprises: purchaser information receiving means which receives information which identifies the prospective purchaser from the terminal of the computer of the prospective purchaser; and contact information transmitting means which transmits information necessary for contacting the prospective purchaser to a terminal of a computer of a seller selling the real estate object, or transmitting information necessary for contacting the real estate object seller to the terminal of the computer of the prospective purchaser upon receiving the purchaser information.

The inventive system further comprises: means which receives a notice that a sales contract regarding the real estate object has been completed from a terminal of a computer of a seller selling the real estate object or the terminal of the computer of the purchaser who purchased the real estate object; a database which stores information regarding the completed sales contract in conjunction with the contact information of the purchaser who purchased the real estate object, information regarding a date of completing the sales contract, and the housing display data correlated with the purchased real estate object upon receiving the notice; means which stores a reforming plan which has been created based on the housing display data; means which calculates a time that a reforming plan be proposed regarding the real estate object based on the sales contract completion date; and means which presents the reforming plan to the purchaser based on the contact information when the proposal time has come.

The inventive system further comprises data registration tool providing means which provides via the network system the database with a data registration tool with which the housing display data is registered via the network system upon request from a terminal of a computer of a real estate object seller.

The inventive system has the feature that the database is so configured as to store a plurality of interior display data including information regarding an interior of the housing, and the data transmitting means is so configured as to transmit the interior display data stored in the database to the terminal of the computer of the prospective purchaser via the network system upon request from the browser on the terminal of the computer of the prospective purchaser. The browser includes a third display section which displays an interior manipulating menu with which a user selects the interior to be displayed in the virtual space from the interior display data.

The inventive system further has the feature that the database is so configured as to store the interior display data in conjunction with information regarding commodity of the interior of the housing.

The inventive system further comprises data registration tool providing means which provides via the network system the database with a data registration tool with which the interior display data is registered via the network system upon request from a terminal of the computer of an interior commodity seller.

The inventive system also has the feature that the database is so configured as to store furniture display data including information regarding a configuration of furniture to be arranged in the housing, and the data transmitting means is so configured as to transmit the furniture display data stored in the database to the terminal of the computer of the prospective purchaser via the network system upon request from the browser on the terminal of the computer of the prospective purchaser. The browser includes a fourth display section which displays a furniture manipulating menu with which a user selects the furniture to be displayed in the virtual space from the furniture display data.

The inventive system further has the feature that the user is allowed to select a location for displaying the furniture in the virtual space.

The inventive system furthermore has the feature that the database is so configured as to store the furniture display data in conjunction with information regarding furniture.

The inventive system further comprises data registration tool providing means which provides via the network system the database with a data registration tool with which the furniture display data is registered via the network system upon request from a terminal of a computer of a furniture seller.

The inventive system moreover has the feature that the furniture display data stored in the database is publicized on the Internet at a web site virtually displaying furniture on sale, and the browser is so configured as to enable the user to obtain the furniture display data by accessing the web site.

According to a further aspect of this invention, this invention is directed to a housing-related commodity sales support system capable of providing informing regarding housing-related commodity to a terminal of a computer of a prospective purchaser via a network system, comprising: a database which stores a plurality of interior display data including information regarding an interior of a housing; housing data creating tool providing means which provides via the network system a housing data creating tool with which housing display data including information regarding a layout of the housing is created upon request from the terminal of the computer of the prospective purchaser; browser providing means which provides a browser including at least a first display section which displays the interior of the housing as a three-dimensional virtual space based on the housing display data, a second display section which displays a viewpoint manipulating menu with which a user manipulates a viewpoint in the virtual space, and a third display section which displays an interior manipulating menu with which the user selects the interior of the housing to be displayed in the virtual space from the plurality of interior display data upon request from the terminal of the computer of the prospective purchaser; and data transmitting means which transmits the interior display data stored in the database to the terminal of the computer of the prospective purchaser via the network system upon request from the browser on the terminal of the computer of the prospective purchaser.

According to yet another aspect of this invention, this invention is directed to a housing-related commodity sales support system capable of providing informing regarding housing-related commodity to a terminal of a computer of a prospective purchaser via a network system, comprising: a database which stores a plurality of furniture display data including information regarding a configuration of furniture to be arranged in an interior of a housing; housing data creating tool providing means which provides via the network system a housing data creating tool with which housing display data including information regarding a layout of the housing is created via the network system upon request from the terminal of the computer of the prospective purchaser; browser providing means which provides a browser including at least a first display section which displays an interior of the housing as a three-dimensional virtual space based on the housing display data, a second display section which displays a viewpoint manipulating menu with which a user manipulates a viewpoint in the virtual space, and a fourth display section which displays a furniture manipulating menu with which the user selects furniture to be displayed in the housing in the virtual space from the plurality of furniture display data upon request from the terminal of the computer of the prospective purchaser; and data transmitting means which transmits the furniture display data stored in the database to the terminal of the computer of the prospective purchaser via the network system upon request from the browser on the terminal of the computer of the prospective purchaser.

According to still another aspect of this invention, this invention is directed to a housing-related commodity sales support method of providing information regarding housing-related commodity to a terminal of a computer of a prospective purchaser via a network system, comprising: a step of storing housing display data including information regarding a layout of a housing in a database; a step of receiving a request that a browser be provided from the terminal of the computer of the prospective purchaser, the browser including at least a first display section which displays an interior of the housing as a three-dimensional virtual space based on the housing display data, and a second display section which displays a viewpoint manipulating menu with which a user manipulates a viewpoint in the virtual space; a step of providing the browser to the terminal of the computer of the prospective purchaser upon request therefrom; and a step of transmitting the housing display data stored in the database to the terminal of the computer of the prospective purchaser via the network system upon request from the request from the browser on the terminal of the computer of the prospective purchaser.

According to yet another aspect of this invention, this invention is directed to a housing-related commodity sales support program activating a computer as a browser to obtain the housing display data from a predetermined database via a network system, the browser including at least a first display section which displays an interior of a housing as a three-dimensional virtual space based on housing display data, and a second display section which displays a viewpoint manipulating menu with which a user manipulates a viewpoint in the virtual space.

According to still another aspect of this invention, this invention is directed to a computer readable storage medium storing a housing-related commodity sales support program activating a computer as a browser to obtain the housing display data from a predetermined database via a network system, the browser including at least a first display section which displays an interior of a housing as a three-dimensional virtual space based on housing display data, and a second display section which displays a viewpoint manipulating menu with which a user manipulates a viewpoint in the virtual space.

According to a still further aspect of this invention, this invention is directed to a housing-related commodity sales support program activating a computer to link to a predetermined database via a network system and activating the computer as a data registration tool with which a user registers housing display data including information regarding a layout of a housing.

According to yet another aspect of this invention, this invention is directed to a computer readable storage medium storing a housing-related commodity sales support program activating a computer to link to a predetermined database via a network system and activating the computer as a data registration tool with which a user registers housing display data including information regarding a layout of a housing.

EXPLOITATION IN INDUSTRY

According to this invention, there can be provided a housing-related commodity sales support system for selling housing-related commodity such as objects of real estate and furniture via a network system such as the Internet, a method of supporting housing-related commodity sales, a program for supporting housing-related commodity sales, and a computer-readable storage medium storing such a program.

The invention claimed is:

1. A housing-related commodity sales support system that provides information regarding a housing-related commodity to a computer of a prospective purchaser via a network system, comprising:

a database which stores housing display data for display of an image of a housing, including information regarding a layout of the housing;

a browser provider that provides the computer of the prospective purchaser with a browser that enables the prospective purchaser to see a three-dimensional image of the housing on the computer in accordance with the database, the browser including at least a first display performing section that enables a three-dimensional display of an interior of the housing, and a second display performing section that enables the prospective purchaser to move, within the displayed housing, a viewpoint from which the interior of the housing is seen, and to have a view as if the prospective purchaser is moving in the interior of the housing, and a data transmitter that transmits the housing display data stored in the database to the computer of the prospective purchaser via the network system in response to a request from the browser provided on the computer of the prospective purchaser, wherein the database is configured to store furniture display data including information regarding a configuration of a furniture to be arranged in the housing;

the browser includes a fourth display section which displays a furniture manipulating menu with which a user selects the furniture to be displayed in the virtual space from the furniture display data; and the data transmitter is configured to transmit the furniture display data stored in the database to the computer of the prospective purchaser via the network system upon request from the browser on the computer of the prospective purchaser.

2. The system according to claim 1, wherein the user is allowed to select a location of the furniture to be displayed in the virtual space.

3. The system according to claim 1, wherein the database is configured to store the furniture display data in conjunction with information regarding furniture.

4. The system according to claim 3, further comprising a data registration tool provider which, upon request from a computer of a furniture seller, provides via the network system the database with a data registration tool with which the furniture display data is registered via the network system.

5. The system according to claim 3, wherein the furniture display data stored in the database is publicized on the Internet at a web site virtually displaying furniture on sale, and the browser is configured to enable the prospective purchaser to obtain the furniture display data by accessing the web site.

6. A housing-related commodity sales support system capable of providing informing regarding housing-related commodity to a computer of a prospective purchaser via a network system, comprising:

a database which stores a plurality of furniture display data for displaying an image of a furniture and including information regarding a configuration of furniture to be arranged in an interior of a housing;

a housing data creating tool provider which, upon request from the computer of the prospective purchaser, provides via the network system a housing data creating tool with which housing display data for display of an image of the housing and including information regarding a layout of the housing is created via the network;

a browser provider which provides a browser to the computer of the prospective purchaser in response to a request from the computer, the browser enabling the prospective purchaser to view a three-dimensional display of the housing and including at least a first display performing section which displays an interior of the housing as a three-dimensional virtual space based on the housing display data, a second display performing section that enables the prospective purchaser to move, within the displayed housing, a viewpoint location from which the interior of the housing is seen and to change the view of the interior of the housing in accordance with a movement of the viewpoint location, thereby providing a view as if the prospective purchaser is looking around the interior of the housing, and a third display performing section that enables the user to select furniture to be displayed in the housing in the virtual space from the plurality of furniture display data; and a data transmitter which, upon request from the browser on the computer of the prospective purchaser, transmits the furniture display data stored in the database to the computer of the prospective purchaser via the network system.

* * * * *